(12) United States Patent
Apreleva et al.

(10) Patent No.: US 9,892,168 B1
(45) Date of Patent: Feb. 13, 2018

(54) TRACKING AND PREDICTION OF SOCIETAL EVENT TRENDS USING AMPLIFIED SIGNALS EXTRACTED FROM SOCIAL MEDIA

(71) Applicant: HRL Laboratories, LLC, Malibu, CA (US)

(72) Inventors: Sofia S. V. Apreleva, Santa Monica, CA (US); Tsai-Ching Lu, Thousand Oaks, CA (US); Ryan F. Compton, New York, NY (US); Matthew S. Keegan, Boston, MA (US); Craig Lee, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/163,547

(22) Filed: May 24, 2016

Related U.S. Application Data

(63) Continuation-in-part of application No. 14/295,101, filed on Jun. 3, 2014, which is a continuation-in-part of application No. 14/210,265, filed on Mar. 13, 2014, now Pat. No. 9,794,358, application No. 15/163,547, which is a continuation-in-part of application No. 14/210,265, filed on Mar. 13, 2014, now Pat. No. 9,794,358, and a continuation-in-part of application No. 14/539,828, filed on Nov. 12, 2014, which is a continuation-in-part of application No.
(Continued)

(51) Int. Cl.
*G06F 17/30* (2006.01)
*G06N 7/00* (2006.01)

(52) U.S. Cl.
CPC .... *G06F 17/3053* (2013.01); *G06F 17/30551* (2013.01); *G06F 17/30867* (2013.01); *G06N 7/005* (2013.01)

(58) Field of Classification Search
CPC .................................................. G06F 17/3053
See application file for complete search history.

(56) References Cited

U.S. PATENT DOCUMENTS

2011/0125826 A1  5/2011  Erhart et al.
2012/0330721 A1  12/2012  Volpe et al.
(Continued)

OTHER PUBLICATIONS

Scott, Steven L. and Varian, Hal R., Predicting the Present with Bayesian Structural Time Series (Jun. 28, 2013). <http://dx.doi.org/10.2139/ssrn.2304426>.*

(Continued)

*Primary Examiner* — Syed Hasan
(74) *Attorney, Agent, or Firm* — Tope-McKay & Associates

(57) ABSTRACT

Described is a system for tracking and predicting social events. The system filters a time series of data obtained from a social media source. Enhanced filtered signals (EFS) are extracted from the filtered time series data based on an amplification signal obtained via a summation of signals relevant to a process of interest in the filtered time series data. A level of human social activity in the social media source is monitored by comparing the extracted EFS to an event database to detect an increase in a number of social activity events in the social media source compared to the event database.

18 Claims, 19 Drawing Sheets
(1 of 19 Drawing Sheet(s) Filed in Color)

Related U.S. Application Data

14/295,101, filed on Jun. 3, 2014, which is a continuation-in-part of application No. 14/210,265, filed on Mar. 13, 2014, now Pat. No. 9,794,358, said application No. 14/539,828 is a continuation-in-part of application No. 14/210,265, filed on Mar. 13, 2014, now Pat. No. 9,794,358.

(60) Provisional application No. 61/809,160, filed on Apr. 5, 2013, provisional application No. 61/831,058, filed on Jun. 4, 2013, provisional application No. 61/903,618, filed on Nov. 13, 2013, provisional application No. 62/196,569, filed on Jul. 24, 2015.

(56) References Cited

U.S. PATENT DOCUMENTS

| | | |
|---|---|---|
| 2013/0073336 A1 | 3/2013 | Heath |
| 2013/0218965 A1 | 8/2013 | Abrol |

OTHER PUBLICATIONS

M. T. Malik, A. Gumel, L. H. Thompson, T. Strome, and S. M. Mahmud, "'Google Flu Trends' and Emergency Department Triage Data Predicted the 2009 Pandemic H1N1 Waves in Manitoba," Canadian Journal of Public Health, vol. 102, issue No. 4, pp. 294-297, 2011.

F. Pervaiz, M. Pervaiz. N. Abdur Rehman, and U. Saif, "FluBreaks: early epidemic detection from Google flu trends," J. Med. Internet Res., vol. 14, No. 5, pp. e125-1-e125-16, Jan. 2012.

S. P. O'Brien, "Crisis Early Warning and Decision Support: Contemporary Approaches and Thoughts on Future Research," Defense Advanced Research Projects Agency International Studies Review (Impact Factor: 0.74), 12(1): pp. 87-104, 2010.

M. D. Ward, A. Beger, J. Cutler, C. Dorff, and B. Radford, "Comparing GDELT and ICEWS Event Data," vol. 1, pp. 1-10, 2013, Wardlab.

Ward, Michael D et al. 2012. "Geographical Models of Crises: Evidence from ICEWS". In Advances in Design for Cross-Cultural Activities, Part I, Advances in Design for Cross-Cultural Activities, Part I, Dylan D Schmorrow and Denise M Nicholson, Boca Raton, FL: CRC Press, pp. 429-438.

P. A. Grabowicz and V. M. Eguiluz, "Heterogeneity shapes groups growth in social online communities," EPL Europhysics Lett., vol. 97, No. 2, pp. 28002-p1-28002-p5, 2012.

D. Braha, "Global civil unrest: contagion, self-organization, and prediction," PLoS One, vol. 7, No. 10, pp. e48596-1-e48596-9, Jan. 2012.

H. Becker, M. Naaman, and L. Gravano, "Beyond Trending Topics: Real-World Event Identification on Twitter," International Conference on Web and Social Media, ICWSM, pp. 1-17, 2011.

A. Zubiaga, D. Spina, and R. Martinez, "Classifying Trending Topics : A Typology of Conversation Triggers on Twitter," Evaluation. pp. 8-11, 2011.

J. Story, M. Hall, and J. Wickstra, "Discovering Trending Topics on Twitter Via Retweets," Computer (Long. Beach. Calif), 2011, pp. 1-6.

N. Pervin, F. Fang, A. Datta, K. Dutta, and D. Vandermeer, "Fast, Scalable, and Context-Sensitive Detection of Trending Topics in Microblog Post Streams," ACM Trans. Manag, Inf. Syst., vol. 3, pp. 1-24, 2013.

L. Aiello, G. Petkos, and C. Martin, "Sensing trending topics in Twitter," IEEE Transactions on Multimedia, vol. 15, No. 6, pp. 1268-1282, 2013.

D. Wilkinson and M. Thelwall, "Trending Twitter topics in English: An international comparison," J. Am. Soc. Inf. Sci. Teohnol., vol. 63, pp. 1631-1646, 2012.

L. Hong, A. Ahmed, S. Gurumurthy, A. J. Smola, and K. Tsioutsiouliklis, "Discovering geographical topics in the Twitter stream," Proc. 21st Int. Conf. World Wide Web—WWW '12, pp. 769-779, 2012.

D. Jurgens, "That's What Friends Are For : Inferring Location in Online Social Media Platforms Based on Social Relationships," in Proceedings of the Seventh International AAAI Conference on Weblogs and Social Media That's, 2013, pp. 273-282.

L. Hong, A. Ahmed, and S. Gurumurthy, "Discovering geographical topics in the Twitter stream," in Proceedings of the 21st international conference on World Wide Web, pp. 769-778, 2012.

M. Krstajic, C. Rohrdantz, M. Hund, and A. Weiler, "Getting there first: real-time detection of real-world incidents on Twitter," in 2nd Workshop on Interactive Visual Text Analytics: Task-Driven Analysis of Social Media Content with Visweek'12, 2012, pp. 2-5.

T. Kraft, D. X. Wang, J. Delawder, W. Dou, and W. Ribarsky, "Less After-the-Fact: Investigative visual analysis of events from streaming Twitter," 2013 IEEE Symp. Large-Scale Data Anal. Vis., pp. 95-103, Oct. 2013.

S. Ardon, A. Bagchi, A. Mahanti, A. Ruhela, A. Seth, R. M. Tripathy, and S. Triukose, "Spatio-temporal and events based analysis of topic popularity in Twitter," in Proceedings of the 22nd ACM international conference on Conference on information & knowledge management, 2013, pp. 219-228.

R. Compton, C. Lee, J. Xu, L. Artieda-moncada, T. Lu, L. De Silva, and M. Macy, "Using publicly vlsible social media to build detailed forecasts of civil unrest." Security Informatics, pp. 1-11, 2013.

Manrique, H. Qi, A. Morgenstern, N. Velasquez, T.-C. Lu, and N. Johnson, "Context matters: Improving the uses of big data for forecasting civil unrest: Emerging phenomena and big data," 2013 IEEE International Conference on Intelligence and Security Informatics. IEEE, pp. 169-172, Jun. 2013.

C. A, A. Beauchemin and A. Handel, "A review of mathematical models of influenza A infections within a host or cell culture: lessons learned and challenges ahead," BMC Public Health, vol. 11, No. suppl 1, pp. S7-1-S7-15, 2011.

E. O. Nsoesie, R. J. Beckman, S. Shashaani, K. S. Nagaraj, and M. V Marathe, "A Simulation Optimization Approach to Epidemic Forecasting ," PLoS One, vol. 8, No. 6, pp. e67164-1-e67164-10, Jan. 2013.

L. N. Murillo, M. S. Murillo, and A. S. Perelson, "Towards multiscale modeling of influenza infection," J. Theor. Biol., vol. 332, pp. 267-290, Sep. 2013.

J. Ginsberg, M. H. Mohebb:, R. S. Patel, L. Brammer, M. S. Smolinski, and L. Brilliant, "Detecting influenza epidemics using search engine query data," Nature, vol. 457, No. 7232, pp. 1012-1015, 2009.

H. A. Carneiro and E. Mylonakis, "Google Trends: A Web-Based Tool for Real-Time Surveillance of Disease Outbreaks," Clin. Infect. Dis., vol. 49, No. 10, pp. 1557-1564, 2009.

A. F. Dugas, et al. "Influenza Forecasting with Google Fiu Trends." (2013) PLoS ONE 8(2): pp. e56176-1-e56176-7. doi: 10.1371/journal.pone.0056176.

M. Kang, H. Zhong, J He, S. Rutherford, and F. Yang, "Using Google Trends for Influenza Surveillance in South China," PLoS One, vol. 8, No. 1, 2013, pp. e55205-1-e55205-6.

X. Zhou, Q. Li, Z. Zhu, and H. Zhao, "Monitoring Epidemic Alert Levels by Analyzing Internet Search Volume," IEEE Trans. Biomed. Eng., vol. 60, No. 2, pp. 446-452, 2013.

K. Wilson and J. S. Brownstein, "Early detection of disease outbreaks using the Internet." CMAJ, vol. 180, No. 8, pp. 829-831, Apr. 2009.

B. M. Althouse, Y. Y. Ng, and D. A. T. Cummings, "Prediction of Dengue Incidence Using Search Query Surveillance," PLoS Negl. Trop. Dis., vol. 5, No. 8, pp. e1258-1-e1258-7, 2011.

P. M. Polgreen, Y. Chen, D. M. Pennock, and F. D. Nelson, "Using internet searches for influenza surveillance," Clin. Infect Dis., vol. 47, No. 11, pp. 1443-1148, Dec. 2008.

A. Hulth and G. Rydevik, "Get Well: an automated surveillance system for gaining new epidemiological knowledge," BMC Public Health, vol. 11. 2011, pp. 252-1-252-8.

L. Samaras, E. Garcia-Barriocanal, and M.-A. Sicilia, "Syndromic surveillance models using Web data: the case of scarlet fever in the UK," Inform. Health Soc. Care, vol. 37, No. 2, pp. 106-124, Mar. 2012.

(56) References Cited

OTHER PUBLICATIONS

X. Zhou, J. Ye, and Y. Feng, "Tuberculosis surveillance by analyzing Google trends," IEEE Trans. Biomed. Eng., vol. 58, No. 8, pp. 2247-2254, Aug. 2011.
D. Jurgens, "That's what friends are for: Inferring location in online communities based on social relationships," ICWSM, Proceedings of the Seventh International AAAI Conference on Weblogs and Social Media, 2013, pp. 273-282.
H. Achrekar, A. Gandhe, R. Lazarus, S.-H. Yu, and B. Liu, "Predicting flu trends using twitter data," in Computer Communications Workshops (INFOCOM WKSHPS), 2011 IEEE Conference on. IEEE, 2011, pp. 702-707.
M. Paul and M. Dredze, "You are what you tweet: Analyzing twitter for public health," in Fifth International AAAI Conference on Weblogs and Social Media (ICWSM 2011), Proceedings of the Fifth International AAAI Conference on Weblogs and Social Media, 2011, pp. 265-272.
D. Mocanu, A. Baronchelli, N. Perra, B. Gonalves, Q. Zhang, and A. Vespignani, "The twitter of babel: Mapping world languages through microblogging platforms," PLoS ONE, vol. 8, No. 4, p. e61981, Apr. 2013, pp. 1-9.
A. Tumasjan, T. O. Sprenger, P. G. Sandner, and I. M. Welpe, "Predicting elections with twitter: What 140 characters reveal about political sentiment," in Proceedings of the fourth international AAAI conference on weblogs and social media, 2010, pp. 178-185.
R. Compton, C. Lee, T.-C. Lu, L. D. Silva, and M. Macy, "Detecting future social unrest in unprocessed twitter data," in IEEE Intelligence and Security Informatics (ISI), 2013, pp. 56-60.
B. Mandel, A. Culotta, J. Boulahanis, D. Stark, B. Lewis, and J. Rodrigue,"A demographic analysis of online sentiment during hurricane irene," in Proceedings of the Second Workshop on Language in Social Media. Association for Computational Linguistics, 2012, pp. 27-36.
h t p : / / thenextweb.com/2010/01/15/Twitter-geofail-023-tweets-geotagged, taken on Nov. 4, 2014.
J. Mahmud, J. Nichols, and C. Drews, "Where is this tweet from? inferring home locations of twitter users," Proc AAAI ICWSM, Proceedings of the Sixth International AAAI Conference on Weblogs and Social Media, vol. 12, 2012, pp. 511-514.
Y. Takhteyev, A. Gruzd, and B. Wellman, "Geography of twitter networks," Social Networks, vol. 34, No. 1, pp. 73-81, 2012.
D. Mok, B. Wellman, and J. Carrasco, "Does distance matter in the age of the internet?" Urban Studies, vol. 47, No. 13, pp. 2747-2783, 2010.
J. Goldenberg and M. Levy, "Distance is not dead: Social interaction and geographical distance in the internet era," arXiv preprint arXiv:0906.3202, 2009, pp. 1-22.
X. Bresson, T. Laurent, D. Uminsky, and J. H. von Brecht, "Convergence and energy landscape for cheeger cut clustering," Part of: Advances in Neural Information Processing Systems 25 (NIPS 2012), pp. 1394-1402.
A. Szlam and X. Bresson, "Total variation and cheeger cuts," Proceedings of the 27th International Conference on Machine Learning, pp. 1039-1046, 2010.
L. Rudin, S. Osher, and E. Fatemi, "Nonlinear total variation based noise removal algorithms," Physica D: Nonlinear Phenomena, vol. 60, No. 1-4, pp. 259-268, Nov. 1992.
Granovetter, Mark S. "The Strength of Weak Ties." American Journal of Sociology, vol. 78, No. 6 (May 1973), pp. 1360-1380.
Y. Vardi and C.-H. Zhang, "The multivariate l1-median and associated data depth," Proceedings of the National Academy of Sciences, vol. 97, No. 4, pp. 1423-1426, 2000.
E. Candes, J. Romberg, and T. Tao, "Stable Signal Recovery from Incomplete and Inaccurate Measurements arXiv : math / 0503066v2 [ math . NA ] Dec. 7, 2005," Science, vol. 40698, pp. 1-15, 2005.
A. Szlam and X. Bresson, "A total variation-based graph clustering algorithm for cheeger ratio cuts," Citeseer, 2010, pp. 1-12.
T. Goldstein and S. Osher, "The Split Bregman Method for L1-Regularized Problems," SIAM Journal on Imaging Sciences, vol. 2, No. 2, pp. 323-343, 2009.

P. Getreuer, "Total Variation Inpainting using Split Bregman," Image Processing On Line, 2 (2012), pp. 147-157.
L. M. Smith, M. S. Keegan, T. Wittman, G. O. Mohler, and A. L. Bertozzi, "Improving density estimation by incorporating spatial information," EURASIP J. Adv. Signal Process, vol. 2010, pp. 7:1-7:12, Feb. 2010.
T. Goldstein, X. Bresson, and S. Osher, "Geometric Applications of the Split Bregman Method: Segmentation and Surface Reconstruction," Journal of Scientific Computing, vol. 45, No. 1-3, pp. 272-293, Nov. 2009.
A. Chambolle, "An algorithm for total variation minimization and applications," Journal of Mathematical imaging and vision, vol. 20, No. 1-2, pp. 89-97, 2004.
M. Zhu and T. Chan, "An efficient primal-dual hybrid gradient algorithm for total variation image restoration," UCLA CAM Report, pp. 08-34, 2008.
C.-J. Hsieh, K.-W. Chang, C.-J. Lin, S. S. Keerthi, and S. Sundararajan, "A dual coordinate descent method for large-scale linear svm," in Proceedings of the 25th international conference on Machine learning. ACM, 2008, pp. 408-415.
Y. Li and S. Osher, "Coordinate descent optimization for l1 minimization with application to compressed sensing; a greedy algorithm," Inverse Probl. Imaging, vol. 3, No. 3, pp. 487-503, 2009.
J. K. Bradley, A. Kyrola, D. Bickson, and C. Guestrin, "Parallel coordinate descent for L1-regularized loss minimization," in International Conference on Machine Learning (ICML 2011), Bellevue, Washington, Jun. 2011, arXiv:1105.5379, pp. 1-8.
P. Richtarik and M. Takc, "Parallel coordinate descent methods for big data optimization," arXiv:1212.0873, 2012, pp. 1-43.
C. Scherrer, A. Tewari, M. Halappanavar, and D. Haglin, "Feature clustering for accelerating parallel coordinate descent," Advances in Neural Information Processing Systems 25, pp. 28-36, arXiv:1212.4174, 2012.
P. Richtarik and M. Takac, "Efficient serial and parallel coordinate descent methods for huge-scale truss topology design," in Operations Research Proceedings 2011. Springer, 2012, pp. 27-32.
Rousseeuw, Peter J., and Christophe Croux. "Alternatives to the median absolute deviation." Journal of the American Statistical Association 88.424 (1993), pp. 1273-1283.
Ryan Compton, David Jurgens, David Allen, "Geotagging One Hundred Million Twitter Accounts with Total Variation Minimization," arXiv preprint arXiv:1404.7152, (2014), pp. 1-9.
Office Action 1 for U.S. Appl. No. 14/539,828, dated Dec. 16, 2016.
Response to Office Action 1 for U.S. Appl. No. 14/539,828, dated Mar. 16, 2017.
Cheng, Z.; Caverlee, J.; and Lee, K. (2010) You are where you tweet: a content-based approach to geo-locating twitter users. In Proceedings of the 19th ACM international conference on Information and knowledge management, 759-768. ACM.
Davis Jr, C.; Pappa, G.; de Oliveira, D.; and de L Arcanjo, F. (2011) Inferring the location of twitter messages based on user relationships. Transactions in GIS 15(6):735-751.
Goldenberg, J., and Levy, M. (2009) Distance is not dead: Social interaction and geographical distance in the internet era. arXiv preprint arXiv:0906.3202.
Hecht, B.; Hong, L.; Suh, B.; and Chi, E (2011) Tweets from justin bieber's heart: the dynamics of the location field in user profiles. In Proceedings of the 2011 annual conference on Human factors in computing systems, 237-246. ACM.
Ikawa, Y.; Enoki, M.; and Tatsubori, M. (2012) Location inference using microblog messages. In Proceedings of the 21st international conference companion on World Wide Web, 687-690. ACM.
Mahmud, J.; Nichols, J.; and Drews, C. (2012) Where is this tweet from? inferring home locations of twitter users. Proc AAAI ICWSM 12.
Mok, D.; Wellman, B.; and Carrasco, J. (2010) Does distance matter in the age of the internet? Urban Studies 47 (13):2747-2783.
Pontes, T.; Vasconcelos, M.; Almeida, J.; Kumaraguru, P.; and Almeida, V. (2012) We know where you live: Privacy characterization of foursquare behavior. In UbiComp '12.
K, Leetaru and P. Schrodt, "GDELT: Global data on events, location, and tone, 1979-2012," Pap. Present., International Studies Association, ISA, pp. 1979-2012, 2013.

(56) References Cited

OTHER PUBLICATIONS

Zhu, Xiaojin, and Zoubin Ghahramani. Learning from labeled and unlabeled data with label propagation. Technical Report CMU-CALD-02-107, Carnegie Mellon University, (2002).

Vincenty, Thaddeus. Direct and inverse solutions of geodesics on the ellipsoid with application of nested equations. Survey review 23.176 (1975): 88-93.

Ronkainen, Oja, and Orponen. (2003). Computation of the multivariate Oja median. Developments in Robust Statistics, 344-359. http://users.ics.aalto.fi/orponen/papers/ojamed.pdf.

Vardi and Zhang. (2000). The multivariate L1-median and associated data depth. Proceedings of the National Academy of Sciences. 97(4): 1423-6. http://www.pnas.org/content/97/4/1423.full.pdf.

Cheng, Z., et al., "You are where you tweet: a content-based approach to geo-locating twitter users," In Proceedings of the 19th ACM international conference on Information and knowledge management, 2010, pp. 759-768.

PCT International Search Report and the Written Opinion of the International Searching Authority for PCT/US2014/026846, dated Jul. 14, 2014.

Office Action 1 for U.S. Appl. No. 14/210,265, dated Mar. 31, 2016.

Response to Office Action 1 for U.S. Appl. No. 14/210,265, dated Jun. 30, 2016.

Lars Backstrom et al., Find Me If You Can: Improving Geographical Prediction with Social and Spatial Proximity, Apr. 26-30, 2010, World Wide Web Conference Committee, 2010, pp. 1-10.

Clodoveu Davis Jr et al., Inferring the Location of Twitter Messages Based on User Relationships, Nov. 22, 2011, Transactions in GIS, 15, pp. 735-751.

Office Action 2 for U.S. Appl. No. 14/210,265, dated Oct. 21, 2016.

Response to Office Action 2 for U.S. Appl. No. 14/210,265, dated Jan. 23, 2017.

Communication regarding European Search Report and the European Search Opinion for European Regional Phase Patent Application No. 14780262.3, dated Oct. 13, 2016.

Search strategy in the European Search for European Regional Phase Patent Application No. 14780262.3, dated Oct. 13, 2016.

Search Report in the European Search for European Regional Phase Patent Application No. 14780262.3, dated Oct. 13, 2016.

Search Opinion for European Regional Phase Patent Application No. 14780262.3, dated Oct. 13, 2016.

Lars Backstrom et al: "Find me if you can," Proceedings of the 19th International Conference on World Wide Web. WWW '10. Jan. 1, 2010 (Jan. 1, 2010). XP055188728. New York. New York. USA, pp. 61-69.

Tatiana Pontes et al: "Beware of What You Share: Inferring Home Location in Social Networks." Data Mining Workshops (ICDMW). 2012 IEEE 12th International Conference on. IEEE. Dec. 10, 2012 (Dec. 10, 2012). pp. 571-578. XP032303104.

Clodoveu A. Davis Jr. et al: "Inferring the Location of Twitter Messages Based on User Relationships." Transactions in GIS. vol. 15. No. 6. Dec. 22, 2011 (Dec. 22, 2011). pp. 735-751. XP055305589. GB.

David Jurgens: "That's What Friends Are For: Inferring Location in Online Social Media Platforms Based on Social Relationships," Jun. 27, 2013 (Jun. 27, 2013). pp. 273-282. XP055307355. Retrieved from the Internet: URL:http://www.aaai.orgjocsjindex.php/ICWSM/ICWSM13/paperjviewFile/6067/6366 [retrieved on Oct. 4, 2016].

De Silva, Lalindra, and Ellen Riloff. "User Type Classification of Tweets with Implications for Event Recognition." Proceedings of the Joint Workshop on Social Dynamics and Personal Attributes in Social Media, pp. 98-108, Baltimore, Maryland USA, Jun. 27, 2014, 2014 Association for Computational Linguistics.

X. Zhu and Z. Ghahramani, "Learning from labeled and unlabeled data with label propagation," Technical Report CMU-CALD-02-107, Carnegie Mellon University, Tech. Rep., 2002.

Vincenty, Thaddeus, "Direct and inverse solutions of geodesics on the ellipsoid with application of nested equations," Survey Review 23.176 (1975): 88-93.

Vardi and Zhang, "The multivariate L1-median and associated data depth," Proceedings of the National Academy of Sciences, 97(4): 1423-6, 2000.

Compton et al., "Detecting future social unrest in unprocessed Twitter Data," IEEE Intelligence and Security Informatics, Jun. 4-7, 2013.

H. Kwak, C. Lee, H. Park, and S. Moon, "What is twitter, a social network or a news media?" WWW 2010, Apr. 26-30, 2010.

Office Action 1 for U.S. Appl. No. 14/295,101, dated Sep. 7, 2016.

Abel et al., Semantics+ Filtering+ Search= Twitcident Exploring Information in Social Web Streams, 2012.

Response to Office Action 1 for U.S. Appl. No. 14/295,101, dated Dec. 7, 2016.

Office Action 2 for U.S. Appl. No. 14/295,101, dated Feb. 16, 2017.

\* cited by examiner

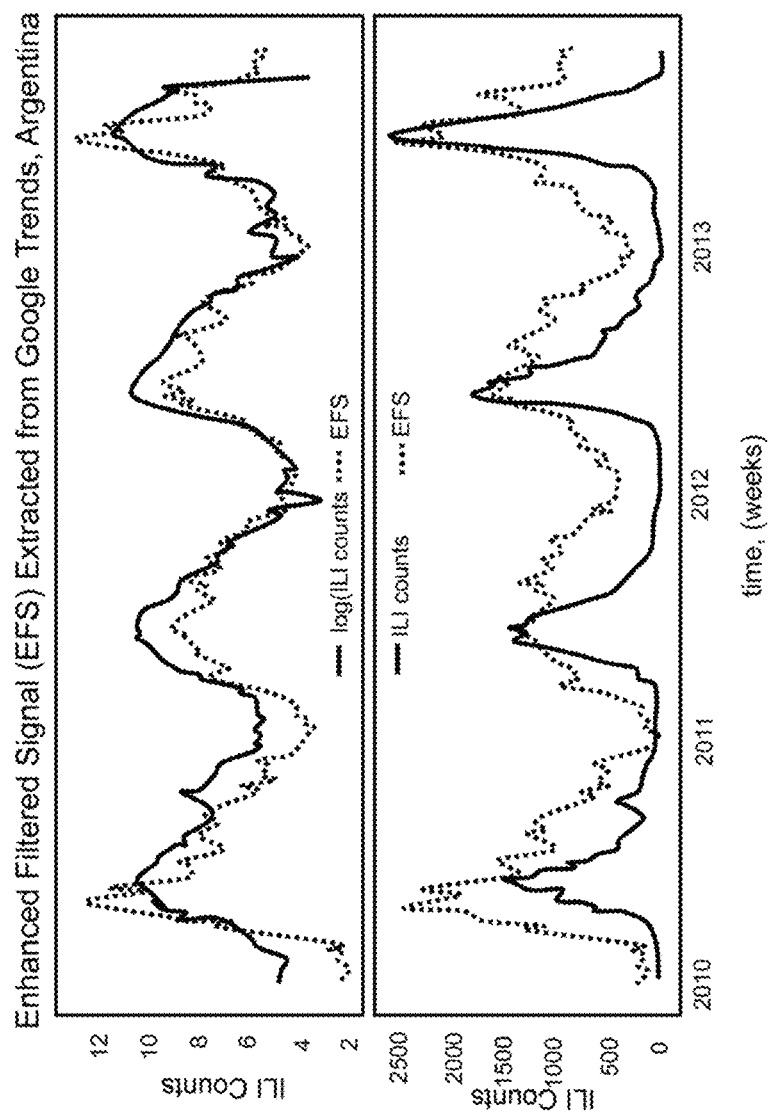

| Country/Forecast | GT | GT trends | TW | TW trends | Historical | GFT | BMA |
|---|---|---|---|---|---|---|---|
| Argentina | 3.03 | 2.04 | 2.71 | 2.22 | 1.77 | 2.34 | 2.94 |
| Bolivia | 2.82 | 1.97 | 2.72 | 2.15 | 2.19 | 2.40 | 2.74 |
| Chile | 3.19 | 2.85 | 2.98 | 2.66 | 2.50 | 2.41 | 3.18 |
| Colombia | 2.91 | 2.81 | 2.66 | 2.74 | 2.26 |  | 2.93 |
| Costa Rica | 2.68 | 2.59 | 2.76 | 2.50 | 1.95 |  | 2.68 |
| Ecuador | 2.77 | 2.34 | 3.24 | 2.93 | 1.23 |  | 3.23 |
| El Salvador | 2.42 | 2.21 | 2.59 | 2.44 | 2.55 |  | 2.78 |
| Guatemala | 2.45 | 2.66 | 3.16 | 2.79 | 1.98 |  | 2.99 |
| Honduras | 2.33 | 2.31 | 2.70 | 2.49 | 2.23 |  | 2.73 |
| Mexico | 2.68 | 2.48 | 2.81 | 2.14 | 2.45 | 1.50 | 2.78 |
| Nicaragua | 2.19 | 2.12 | 2.24 | 2.20 | 1.97 |  | 2.36 |
| Panama | 2.98 | 2.84 | 2.98 | 2.86 | 2.14 |  | 3.05 |
| Paraguay | 2.71 | 2.36 | 2.69 | 2.54 | 1.78 | 2.49 | 2.75 |
| Peru | 2.36 | 2.35 | 2.74 | 2.43 | 2.14 | 1.64 | 2.77 |

FIG. 16

TRACKING AND PREDICTION OF SOCIETAL EVENT TRENDS USING AMPLIFIED SIGNALS EXTRACTED FROM SOCIAL MEDIA

CROSS-REFERENCE TO RELATED APPLICATIONS

This is a Continuation-in-Part application of U.S. Non-Provisional application Ser. No. 14/295,101, filed in the United States on Jun. 3, 2014, entitled, "Social Media Data Mining for Early Detection of Newsworthy Civil Unrest Events," which is a Continuation-in-Part application of U.S. Non-Provisional application Ser. No. 14/210,265, filed in the United States on Mar. 13, 2014, entitled, "Inferring the Location of Users in Online Social Media Platforms Using Social Network Analysis," which is a Non-Provisional patent application of U.S. Provisional Application No. 61/809,160, filed in the United States on Apr. 5, 2013, entitled, "Inferring the Location of Users in Online Social Media Platforms Using Social Network Analysis," the entirety of which are incorporated herein by reference.

U.S. Non-Provisional application Ser. No. 14/295,101 is also a Non-Provisional patent application of U.S. Provisional Application No. 61/831,058, filed in the United States on Jun. 4, 2013, entitled, "Social Media Data Mining for Early Detection of Newsworthy Civil Unrest Events," the entirety of which are incorporated herein by reference.

This is ALSO a Continuation-in-Part application of U.S. Non-Provisional application Ser. No. 14/210,265, filed in the United States on Mar. 13, 2014, entitled, "Inferring the location of Users in Online Social Media Platforms Using Social Network Analysis, which is a Non-Provisional patent application of U.S. Provisional Application No. 61/809,160, filed in the United States on Apr. 5, 2013, entitled, "Inferring the Location of Users in Online Social Media Platforms Using Social Network Analysis," the entirety of which are incorporated herein by reference.

This is ALSO a Continuation-in-Part application of U.S. Non-Provisional application Ser. No. 14/539,828, filed in the United States on Nov. 12, 2014, entitled, "Per-User Accuracy Measure for Social Network Based Geocoding Algorithms," which is a Continuation-in-Part application of U.S. Non-Provisional application Ser. No. 14/295,101, filed in the United States on Jun. 3, 2014, entitled, "Social Media Data Mining for Early Detection of Newsworthy Civil Unrest Events," the entirety of which are incorporated herein by reference.

U.S. Non-Provisional application Ser. No. 14/295,101 is a Continuation-in-Part application of U.S. Non-Provisional application Ser. No. 14/210,265, filed in the United States on Mar. 13, 2014, entitled, "Inferring the Location of Users in Online Social Media Platforms Using Social Network Analysis," which is a Non-Provisional patent application of U.S. Provisional Application No. 61/809,160, filed in the United States on Apr. 5, 2013, entitled, "Inferring the Location of Users in Online Social Media Platforms Using Social Network Analysis," the entirety of which are incorporated herein by reference.

U.S. Non-Provisional application Ser. No. 14/295,101 is also a Non-Provisional patent application of U.S. Provisional Application No. 61/831,058, filed in the United States on Jun. 4, 2013, entitled, "Social Media Data Mining for Early Detection of Newsworthy Civil Unrest Events," the entirety of which are incorporated herein by reference.

U.S. Non-Provisional application Ser. No. 14/539,828 is also a Continuation-in-Part application of U.S. Non-Provisional application Ser. No. 14/210,265, filed in the United States on Mar. 13, 2014, entitled, "Inferring the Location of Users in Online Social Media Platforms Using Social Network Analysis," which is a Non-Provisional patent application of U.S. Provisional Application No. 61/809,160, filed in the United States on Apr. 5, 2013, entitled, "Inferring the Location of Users in Online Social Media Platforms Using Social Network Analysis," the entirety of which are incorporated herein by reference.

U.S. Non-Provisional application Ser. No. 14/539,828 is also a Non-Provisional Application of U.S. Provisional Application No. 61/903,618, filed in the United States on Nov. 13, 2013, entitled, "Per-User Accuracy Measure for Social Network Based Geocoding Algorithms," the entirety of which are incorporated herein by reference.

This is ALSO a Non-Provisional patent application of U.S. Provisional Application No. 62/196,569, filed in the United States on Jul. 24, 2015, entitled, "Tracking and Prediction of Societal Event Trends Using Amplified Signals Extracted from Social Media," the entirety of which is incorporated herein by reference.

GOVERNMENT LICENSE RIGHTS

This invention was made with government support under U.S. Government Contract Number D12PC00285. The government has certain rights in the invention.

FIELD OF INVENTION

The present invention relates to a system for tracking and prediction of social events and, more particularly, to a system for tracking and prediction of social events using amplified signals extracted from social media.

BACKGROUND OF THE INVENTION

Civil unrests can pose a severe threat to the security of individuals, communities, states and regions. Methods for accurate estimation of signs of higher than usual activity serve the purpose of providing security at different levels. Predicting crises and instabilities has been a research priority for many years.

A vast body of literature reflects the need for identification of tweet topics (see Literature Reference Nos. 9-14 in the List of Incorporated Literature References) which would be helpful in providing information about event types and groups of people who are instigating the civil unrest (e.g., protestors). The geolocations of Tweets can be determined using tweet tags (see Literature Reference No. 15) or user's social networks (see Literature Reference No. 16) that can accurately infer locations for nearly all of the individuals by spatially propagating location assignments through the social network using only a small number of initial locations.

Twitter™ is a convenient media to attempt to identify future protest events directly from public micro blogs and tweets/retweets. A number of scientists reached success in predicting social unrest using information contained in Twitter™ (see Literature Reference Nos. 11, 17-21). The method presented by researchers in Literature Reference No. 18 detects potential events by identifying keywords, so-called event-term candidates, whose frequency suddenly becomes significantly higher than expected. Then, all tweets containing the candidate terms are used to compute the scores capturing different characteristics of the event. In Literature Reference No. 21, the authors propose identification of informative posts by applying multiple textual and geographic filters to a high-volume data feed consisting of tens of millions of posts per day which have been flagged as public by their authors. Predictions are then built by annotating the filtered posts, typically a few dozen per day, with demographic, spatial, and temporal information.

Google™ Trends has also been used for predicting civil unrest events. For example, authors in Literature Reference No. 22 present a model which relies on search volumes of event-related terms and their momenta for prediction. The authors posit that an increased interest in civil unrest terms will produce observable real-time behavior consistent with those terms. However, existing methods for predicting and monitoring social events rely on available official statistics.

Thus, a continuing need exists for a system for monitoring and predicting social processes in social media before official statistics are available.

SUMMARY OF THE INVENTION

The present invention relates to a system for tracking and prediction of social events and, more particularly, to a system for tracking and prediction of social events using amplified signals extracted from social media. In some embodiments, the system comprises one or more processors and a memory having instructions such that when the instructions are executed, the one or more processors perform multiple operations. The system filters a time series of data obtained from a social media source. Enhanced filtered signals (EFS) are extracted from the filtered time series data based on an amplification signal obtained via a summation of signals relevant to a process of interest in the filtered time series data. A level of human social activity in the social media source is monitored by comparing the extracted EFS to an event database to detect an increase in a number of social activity events in the social media source compared to the event database.

In another aspect, the extracted EFS is used to generate at least one prediction of at least one of a social event and a trend in human social activity.

In another aspect, the time series of data is filtered with a threshold value $T_r$, wherein the threshold value $T_r$ is an average correlation coefficient between a randomly generated time series of data and a set of ground truth data.

In another aspect, the extracted EFS are regressed on a set of ground truth data with different time windows to obtain a set of regression fits between the extracted EFS and the set of ground truth data.

In another aspect, a set of parameters are obtained from the set of regression fits, and the at least one prediction is generated by applying the set of parameters to new sets of time series data.

In another aspect, Bayesian model averaging is used to weight the at least one prediction according to historical data.

In another aspect, the present invention comprises a method for causing a processor to perform the operations described herein.

Finally, in yet another aspect, the present invention comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The file of this patent or patent application publication contains at least one drawing executed in color. Copies of this patent or patent application publication with color drawing(s) will be provided by the Office upon request and payment of the necessary fee.

The objects, features and advantages of the present invention will be apparent from the following detailed descriptions of various aspects of the invention in conjunction with reference to the following drawings, where:

FIG. 12A is a plot illustrating an EFS signal extracted from Google™ Trends for Argentina with Pan American Health Organization (PAHO) data in log scale according to embodiments of the present disclosure;

FIG. 12B is a plot illustrating an EFS signal extracted from Google™ Trends for Argentina with PAHO data in original scale according to embodiments of the present disclosure;

FIG. 16 is a table of quality scores (QS) for Latin American countries according to embodiments of the present disclosure.

DETAILED DESCRIPTION

Figure 1:
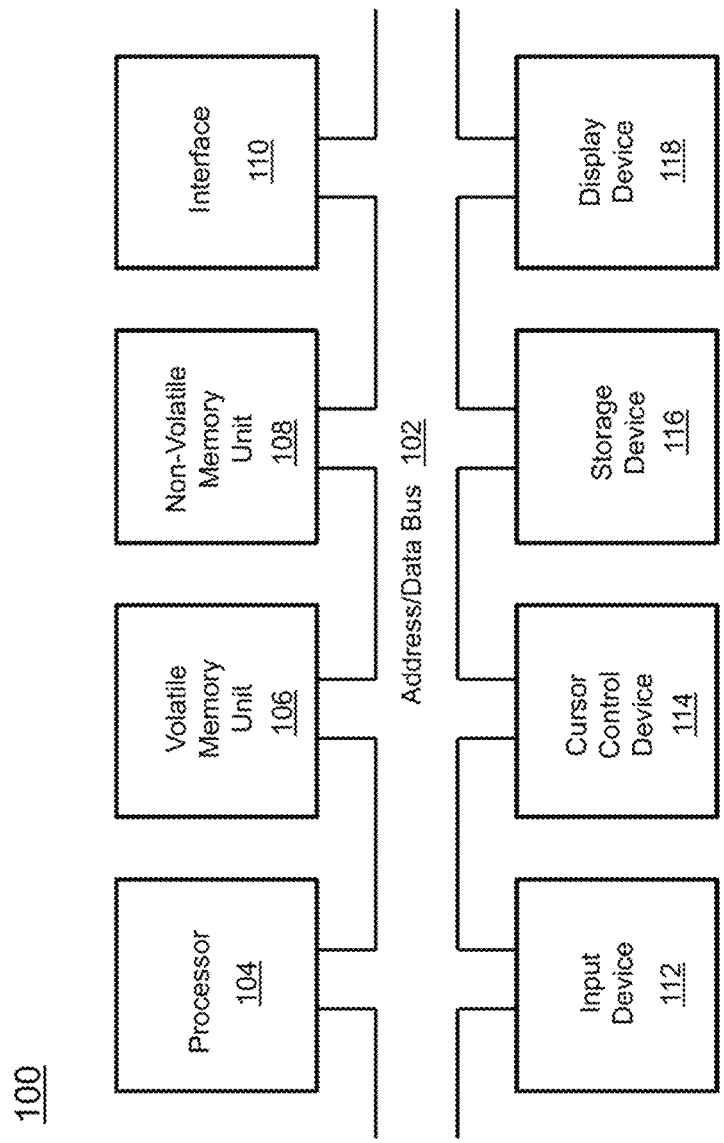
FIG. 1 is a block diagram depicting the components of a system for tracking and prediction of social events according to embodiments of the present disclosure.

The present invention relates to system for tracking and prediction of social events and, more particularly, to a system for tracking and prediction of social events using amplified signals extracted from social media. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of various embodiments. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of literature references as used in the description is provided. Next, a description of various principal aspects of various embodiments is provided. Following that is an introduction that provides an overview of various embodiments. Finally, specific details of various embodiments are provided to give an understanding of the specific aspects.

(1) List of Incorporated Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. K. Leetaru and P. Schrodt, "GDELT: Global data on events, location, and tone, 1979-2012," Pap. Present. ISA . . . , pp. 1979-2012, 2013.
2. M. T. Malik, A. Gumel, L. H. Thompson, T. Strome, and S. M. Mahmud, "'Google Flu Trends' and Emergency Department Triage Data Predicted the 2009 Pandemic H1N1 Waves in Manitoba," vol. 102, no. 4, 2011.
3. F. Pervaiz, M. Pervaiz, N. Abdur Rehman, and U. Saif, "FluBreaks: early epidemic detection from Google flu trends," J. Med. Internet Res., vol. 14, no. 5, p. e125, January 2012.
4. S. P. O'Brien, "Crisis early warning and decision support: Contemporary approaches and thoughts on future research," Int. Stud. Rev., vol. 12, no. 1, pp. 87-104, 2010.
5. S. P. O'Brien, "Crisis Early Warning and Decision Support: Contemporary Approaches and Thoughts on Future Research," Defense Advanced Research Projects Agency International Studies Review (Impact Factor: 0.74), 12(1): 87-104, 2010.
6. M. D. Ward, A. Beger, J. Cutler, C. Dorff, and B. Radford, "Comparing GDELT and ICEWS Event Data," vol. 1, pp. 1-10, 2013.
7. P. A. Grabowicz and V. M. Eguiluz, "Heterogeneity shapes groups growth in social online communities," EPL (Europhysics Lett., vol. 97, no. 2, p. 28002, 2012.
8. D. Braha, "Global civil unrest: contagion, self-organization, and prediction," PLoS One, vol. 7, no. 10, p. e48596, January 2012.
9. H. Becker, M. Naaman, and L. Gravano, "Beyond Trending Topics: Real-World Event Identification on Twitter," ICWSM, pp. 1-17, 2011.
10. A. Zubiaga, D. Spina, and R. Martinez, "Classifying Trending Topics: A Typology of Conversation Triggers on Twitter," Evaluation. pp. 8-11, 2011.
11. J. Story, M. Hall, and J. Wickstra, "Discovering Trending Topics on Twitter Via Retweets," Computer (Long. Beach. Calif.), 2011.
12. N. Pervin, F. Fang, A. Datta, K. Dutta, and D. Vandermeer, "Fast, Scalable, and Context-Sensitive Detection of Trending Topics in Microblog Post Streams," ACM Trans. Manag. Inf. Syst., vol. 3, pp. 1-24, 2013.
13. L. Aiello, G. Petkos, and C. Martin, "Sensing trending topics in Twitter," IEEE Trans . . . , vol. 15, no. 6, pp. 1268-1282, 2013.
14. D. Wilkinson and M. Thelwall, "Trending Twitter topics in English: An international comparison," J. Am. Soc. Inf. Sci. Technol., vol. 63, pp. 1631-1646, 2012.
15. L. Hong, A. Ahmed, S. Gurumurthy, A. J. Smola, and K. Tsioutsiouliklis, "Discovering geographical topics in the Twitter stream," Proc. 21st Int. Conf. World Wide Web—WWW '12, p. 769, 2012.
16. D. Jurgens, "That's What Friends Are For: Inferring Location in Online Social Media Platforms Based on Social Relationships," in Proceedings of the Seventh 16. International AAAI Conference on Weblogs and Social Media That's, 213AD, pp. 273-282.
17. L. Hong, A. Ahmed, and S. Gurumurthy, "Discovering geographical topics in the Twitter stream," in Proceedings of the 21st . . . , 2012.
18. M. Krstajic, C. Rohrdantz, M. Hund, and A. Weiler, "Getting there first: real-time detection of real-world incidents on Twitter," in 2nd Workshop on Interactive Visual Text Analytics: Task-Driven Analysis of Social Media Content with Visweek' 12, 2012, pp. 2-5.
19. T. Kraft, D. X. Wang, J. Delawder, W. Dou, and W. Ribarsky, "Less After-the-Fact: Investigative visual analysis of events from streaming Twitter," 2013 IEEE Symp. Large-Scale Data Anal. Vis., pp. 95-103, October 2013.
20. S. Ardon, A. Bagchi, A. Mahanti, A. Ruhela, A. Seth, R. M. Tripathy, and S. Triukose, "Spatio-temporal and events based analysis of topic popularity in Twitter," in Proceedings of the 22nd ACM international conference on Conference on information & knowledge management, 2013, pp. 219-228.
21. R. Compton, C. Lee, J. Xu, L. Artieda-moncada, T. Lu, L. De Silva, and M. Macy, "Using publicly visible social media to build detailed forecasts of civil unrest." pp. 1-11, 2013.
22. P. Manrique, H. Qi, A. Morgenstern, N. Velasquez, T.-C. Lu, and N. Johnson, "Context matters: Improving the uses of big data for forecasting civil unrest: Emerging phenomena and big data," 2013 IEEE International Conference on Intelligence and Security Informatics. IEEE, pp. 169-172, June-2013.
23. C. A. A. Beauchemin and A. Handel, "A review of mathematical models of influenza A infections within a host or cell culture: lessons learned and challenges ahead," BMC Public Health, vol. 11, no. suppl 1, p. S7, 2011.
24. E. O. Nsoesie, R. J. Beckman, S. Shashaani, K. S. Nagaraj, and M. V Marathe, "A Simulation Optimization Approach to Epidemic Forecasting.," PLoS One, vol. 8, no. 6, p. e67164, January 2013.
25. L. N. Murillo, M. S. Murillo, and A. S. Perelson, "Towards multiscale modeling of influenza infection," J. Theor. Biol., vol. 332, pp. 267-90, September 2013.
26. J. Ginsberg, M. H. Mohebbi, R. S. Patel, L. Brammer, M. S. Smolinski, and L. Brilliant, "Detecting influenza epidemics using search engine query data," Nature, vol. 457, no. 7232, pp. 1012-U4, 2009.
27. H. A. Cameiro and E. Mylonakis, "Google Trends: A Web-Based Tool for Real-Time Surveillance of Disease Outbreaks," Clin. Infect. Dis., vol. 49, no. 10, pp. 1557-1564, 2009.
28. A. F. Dugas, "Influenza Forecasting with Google Flu Trends."
29. M. Kang, H. Zhong, J. He, S. Rutherford, and F. Yang, "Using Google Trends for Influenza Surveillance in South China," PLoS One, vol. 8, no. 1, 2013.
30. X. Zhou, Q. Li, Z. Zhu, and H. Zhao, "Monitoring Epidemic Alert Levels by Analyzing Internet Search Volume," IEEE Trans. Biomed. Eng., vol. 60, no. 2, pp. 446-452, 2013.
31. K. Wilson and J. S. Brownstein, "Early detection of disease outbreaks using the Internet," CMAJ, vol. 180, no. 8, pp. 829-31, April 2009.
32. B. M. Althouse, Y. Y. Ng, and D. A. T. Cummings, "Prediction of Dengue Incidence Using Search Query Surveillance," PLoS Negl. Trop. Dis., vol. 5, no. 8, p. e1258, 2011.
33. P. M. Polgreen, Y. Chen, D. M. Pennock, and F. D. Nelson, "Using internet searches for influenza surveillance," Clin. Infect. Dis., vol. 47, no. 11, pp. 1443-8, December 2008.
34. A. Hulth and G. Rydevik, "GET WELL: an automated surveillance system for gaining new epidemiological knowledge," BMC Public Health, vol. 11, 2011.
35. L. Samaras, E. Garcia-Barriocanal, and M.-A. Sicilia, "Syndromic surveillance models using Web data: the case of scarlet fever in the UK," Inform. Health Soc. Care, vol. 37, no. 2, pp. 106-24, March 2012.
36. X. Zhou, J. Ye, and Y. Feng, "Tuberculosis surveillance by analyzing Google trends," IEEE Trans. Biomed. Eng., vol. 58, no. 8, pp. 2247-2254, August 2011.

(2) Principal Aspects

The present invention has three "principal" aspects. The first is a system for tracking and predicting social events. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
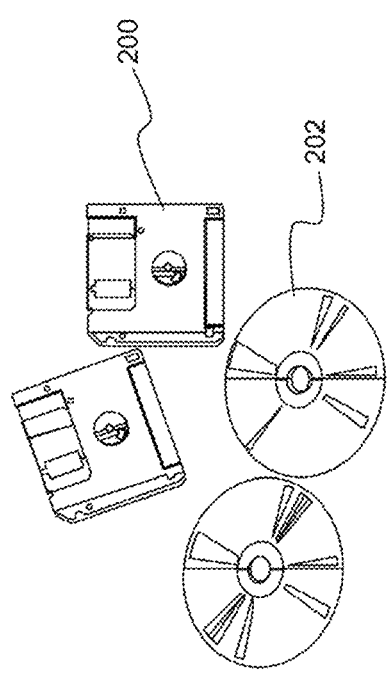
FIG. 2 is an illustration of a computer program product according to embodiments of the present disclosure.

An illustrative diagram of a computer program product (i.e., storage device) embodying an aspect of the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive.

In either event, the instructions are encoded on a non-transitory computer-readable medium.

(3) Specific Details of the Invention (3.1) Enhanced Filtered Signal (EFS) Extraction Described is a system and method for the prediction of significant social events based on keyword time series extracted from Google™ search volumes (e.g., Google™ Trends (GT)) and Twitter™ (TW). Novelties of this approach include: 1) application of an enhanced filtered signal (EFS) extracted from a social media source (e.g., GT, Twitter™) for monitoring activity levels, and 2) the application of the monitored activity levels with a prediction pipeline for out-of-sample event prediction. Experimental studies demonstrated that search activity in Google™ and the usage of specific event-related words in Twitter™ reflect the level of social activity. Such activity levels can be used for prediction and monitoring of a situation while official statistics are yet to become available. In experimental studies of the present invention, Pan American Health Organization (PAHO) data was used for influenza-like illness (ILI) ground truths. The Golden Standard Report (GSR) and Global Database of Events, Language, and Tone (GDELT) database (see Literature Reference No. 1) were used for Civil Unrest (CU) ground truths. In experimental studies using the invention described herein, the performance of the system was demonstrated on two examples: predictions for CU and ILI in 14 Latin America countries. As can be appreciated by one skilled in the art, the system and methods of the present invention can be applied to other domains of social human activity as well.

Figure 3:
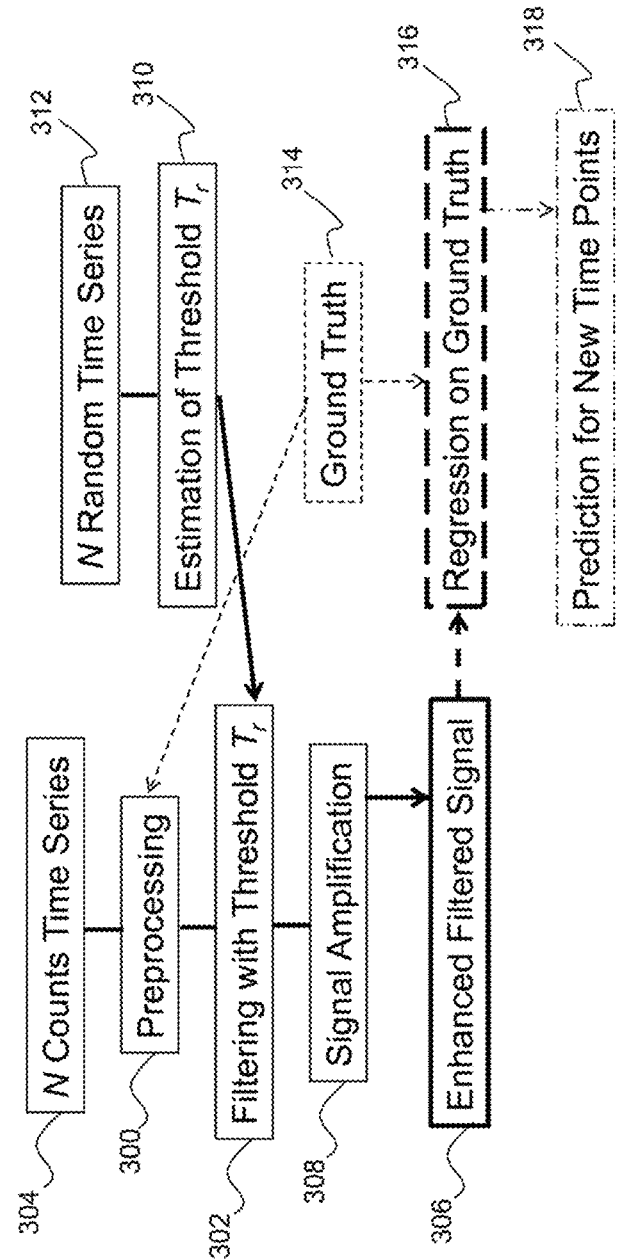
FIG. 3 is a diagram illustrating a systematic view of the enhanced filtered signal (EFS) extraction according to embodiments of the present disclosure.

The present invention is an effective method for tracking social activity level using an enhanced filtered signal (EFS). EFS is based on the idea of signal amplification via summation of chosen search trends. The present invention also comprises an accurate prediction method to conduct surveillance and monitoring of social events in the absence of official information. FIG. 3 depicts a systematic view of EFS signal extraction. An EFS is obtained from filtered and scaled keyword counts time series from, for example, Google™ Trends and Twitter™. A pre-processing module 300 includes a filtering with threshold $T_r$ 302 step of N counts time series 304 (e.g., Google™ Trends, Twitter™ time series) and their scaling. The filtering with threshold $T_r$ 302 step is adjusted for a particular social domain/media to account for differences in underlying processes forming these signals. Computation of the EFS 306 is based on signal amplification 308 of a signal obtained via the summation of signals most relevant to the process of interest's time series. Time series rank is defined here based upon the value of the Pearson correlation coefficient; however, other measures of correlations can also be used in place of the Pearson correlation coefficient.

Filtering with the threshold $T_r$ 302 has two steps. First, the threshold value is estimated 310 (i.e., estimation of threshold $T_r$). The threshold value is an average correlation coefficient between randomly generated time series 312 (i.e., N random time series) and ground truth 314. This step ensures that uncorrelated information and noise is removed, which at random can improve correlation at one time point but worsen it at the other. The second step of filtering with the threshold $T_r$ 302 represents a cycle to find the subset of time series having correlation coefficients from $T_r$ to $R_{max}$, which is the maximum correlation coefficient for a given dataset. Time series which have high negative correlation are added with a negative sign.

A learning module comprises regression with different time windows (e.g., range is from the entire time span to 4 weeks). The regression time window (i.e., the length of time period used in regression) depends mostly on the underlying process dynamics, which often is hard to track and model. Therefore, the entire time span can be divided into periods where model changes are assumed to be slow. In general, the faster the dynamics, the shorter the regression time window. For two non-limiting examples, civil unrest (CU) and disease surveillance, EFS 306 time series are regressed on ground truths 316 of disease occurrences or protests counts with different time windows. Two time windows related to fast and slow dynamics are employed with further averaging to make a final prediction.

Predictions for new time points 318 are made using parameters obtained from these regression fits and applied for new data points (e.g., out-of-sample prediction with unknown ground truths). In experimental studies, the length of prediction varied from 1 day to 1.5 months for CU and from 1 to 5 weeks for ILI counts forecasts. Standard metrics, such as precision, recall, and correlation coefficients, were calculated to demonstrate the effectiveness of the scheme.

An enhanced filtered signal (EFS) can be extracted from various social media platforms. In experimental studies, the system described herein demonstrated predictions employing Google™ Trends and Twitter™; however, the method can be expanded to other media, such as Tumblr™, Facebook, and others. The combination of forecasts can be done in several ways: via simple/weighted averaging, using Bayesian model averaging, or based on performance metrics depending on underlying hypotheses about the model performance. Using the present invention, results were demonstrated based on Bayesian model averaging for ILI prediction. In the case of civil unrest, results are shown for Google™ Trends and Twitter™ (as described below), with the focus on Twitter™ because predictions made with Google™ Trends are noisier and do not have daily time granularity.

(3.2) Example for EFS Extraction and Prediction of Activity Level for Civil Unrest The performance of the system according to some embodiments of the present invention for EFS signal extraction and activity level prediction was validated for civil unrest on ten Latin America countries. Details are provided on the prediction of CU activity levels in Venezuela, and precision/recall results for nine other Latin America countries, which were obtained by simulating real-time predictions made on Twitter™ data from December 2013 to February 2014.

(3.2.1) EFS Extracted from Google™ Trends

In the example implementation, Google™ Trends data was downloaded from their website. Typically, the downloader (i.e., a computer program written specifically to periodically query social medial platform data) is given a query file listing the search strings, locations, and a date range. This is then converted to a series of individual searches, each one consisting of a single search string, single location, and date range. The downloader also maintains a calendar-week cache. The downloader checks the weekly cache, and if no match is found, then it does a web download of the individual search. After all the individual searches are completed, they are assembled together into a time-series file.

Many (e.g., 68) CU-related keywords were used in Spanish, Portuguese and English, including "march", "protest", "boycott", "police", "corruption" and others, as determined by an expert. The data collected covered a time period from January 2004 up to January 2014. Time granularity of the signal is weekly or monthly, depending on search strength and keyword "popularity" (i.e., search frequency by all web users using a search engine). Google™ Trends typically experience significant trends due to the increased number of Internet users (e.g., weekly, yearly) in general, which results in more searches using the search engine. This increase could also be due to Internet access being available for more countries or rural areas, or more mobile devices being adopted. Even if considered on a two year time span, the time series were de-trended and scaled into a range from 0 to 1 to normalize over the basis. Additionally, a monthly signal of aggregations was recalculated to a weekly level. It is assumed that monthly signals will be scaled down to weekly signals by uniform distribution among the weeks. After these pre-processing steps are completed, the EFS 306 signal is extracted as described above.

Figure 4A:
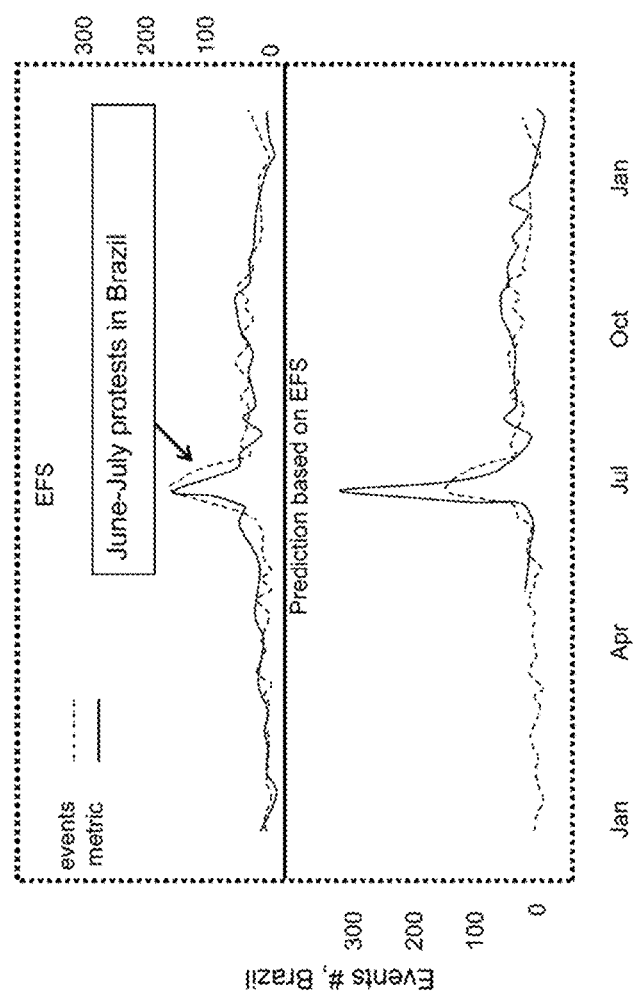
FIG. 4A is a plot illustrating prediction of civil unrest (CU) events in Brazil based on an EFS extracted for CU-related keywords according to embodiments of the present disclosure.
Figure 4B:
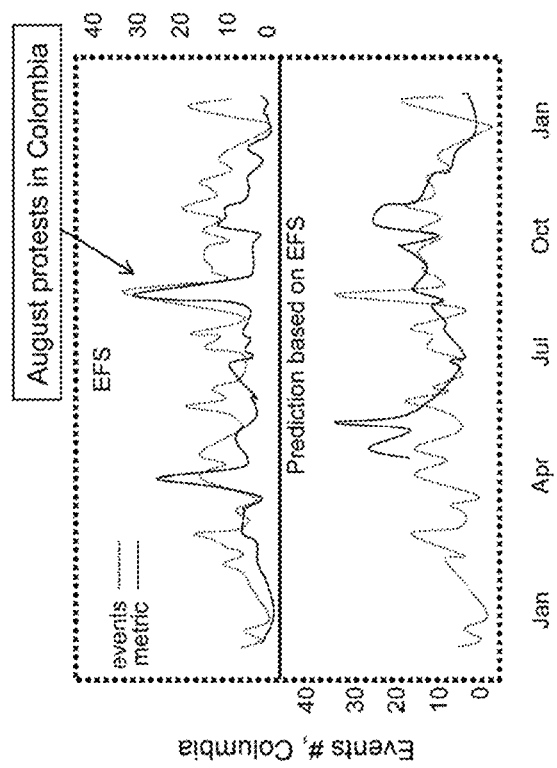
FIG. 4B is a plot illustrating prediction of civil unrest (CU) events in Colombia based on an EFS extracted for CU-related keywords according to embodiments of the present disclosure.

FIGS. 4A and 4B illustrate examples of prediction of a number of CU events in Brazil and Colombia, respectively, based on EFS signals extracted from Google™ Trends for CU-related keywords counts time series. The top row plots of FIGS. 4A and 4B represent extracted EFS, and the bottom row plots of FIGS. 4A and 4B represent a prediction made one week ahead of the extracted EFS. As shown in FIG. 4A, Brazil is a good example of reaction, which can be observed and predicted in Google™ Trends as a response to June-July 2013 Brazil protests. As shown in FIG. 4B, Colombia serves as an example that even if the EFS reflects a current situation with a protest's activity level, prediction based on EFS fails to make a correct prediction, indicating that one source is not enough.

(3.2.2) EFS Extracted from Twitter™

Four different types of Twitter™ time series were used in experimental studies using the invention described herein. The difference between the filters was related to various filters which were applied to raw time series of keywords counts. First, a set of time series for CU-related keywords was downloaded using a model configuration tool, a tool for downloading data according to a model and its configured parameters. The total list was comprised of 240 items, compiled by a domain expert and including not only words, but also hash tags related to civil unrest such as "YoSoy132". Tweets were downloaded from GNIP from their Decahose service, which provides a real-time feed of a statistically valid random sample of at least 10% of all Tweets. The Tweets were then geocoded and loaded and indexed by location, date, time, and various other fields using, as a non-limiting example, Elasticsearch. Elasticsearch is a product used to search and analyze data in real time and is produced by Elastic located at 800 West El Camino Real, Suite 350, Mountain View, Calif., 94040. The model configuration tool is typically called with a query file, listing the search strings, locations, and a date range. The model configuration tool queries Elasticsearch to return a time-series file.

Another three sets of time series were filtered using the keyword-based detection algorithm described in U.S. Non-Provisional application Ser. No. 14/295,101, which is hereby incorporated by reference as though fully set forth herein. The keyword-based detection algorithm was used to identify tweets that announced future civil unrest or protest events. Tweets relevant to civil unrest were obtained by applying multiple textual and geographic filters to a real-time high-volume Twitter™ data feed. To surface important tweets, the data feed was filtered for tweets which contain at least one mention of an expert-identified civil unrest keyword and no mentions of clearly not civil unrest "anti-keywords" (e.g. sports teams, music venues,).

A geocoding service (such as that described in U.S. application Ser. Nos. 14/539,828 and 14/210,265, which are hereby incorporated by reference as though fully set forth herein) was used to filter for tweets originating within Latin America and provide city-level geographic resolution. Once these tweets were identified, a second textual filter was applied which retains only tweets containing mentions of future dates (the second set) and of those, when the mention was posted (third set). Each of these sets is hereinafter referred to as future dates sets.

The last and fourth set of keywords time series is collected using posts of the most active users identified by the model and algorithm described in Literature Reference No. 21. Based on the hypothesis that a user's interest in social unrest is approximately constant in time, the set of users who had retweeted the tweets outputted were collected from the model-influence detection algorithm described in Literature Reference No. 21. Retweets are strong indicators of topical interest, since they serve as information diffusion through the Twitter™ network. A user retweets posts that they think would be of interest to their followers. The fourth set of keywords was filtered by keeping only those users that had appeared in separate weeks. Thus, users that showed only temporary interest in social unrest events were removed.

EFS extraction is initialized with de-trending and scaling tweet counts in the range from 0 to 1. In other words, tweet counts are normalized by the overall number of tweets in a defined period of time. De-trending can be performed if time series cover a substantial time span (e.g., 52 weeks as opposed to 4 weeks). An EFS signal 306 is extracted after pre-processing 300 with a typical threshold value (represented by element 302) of, for instance, 0.13+/−0.02, calculated based on correlation of randomly generated time series (represented by element 312) (see section 4.1 and FIG. 3) with ground truth (element 314).

Figure 5:
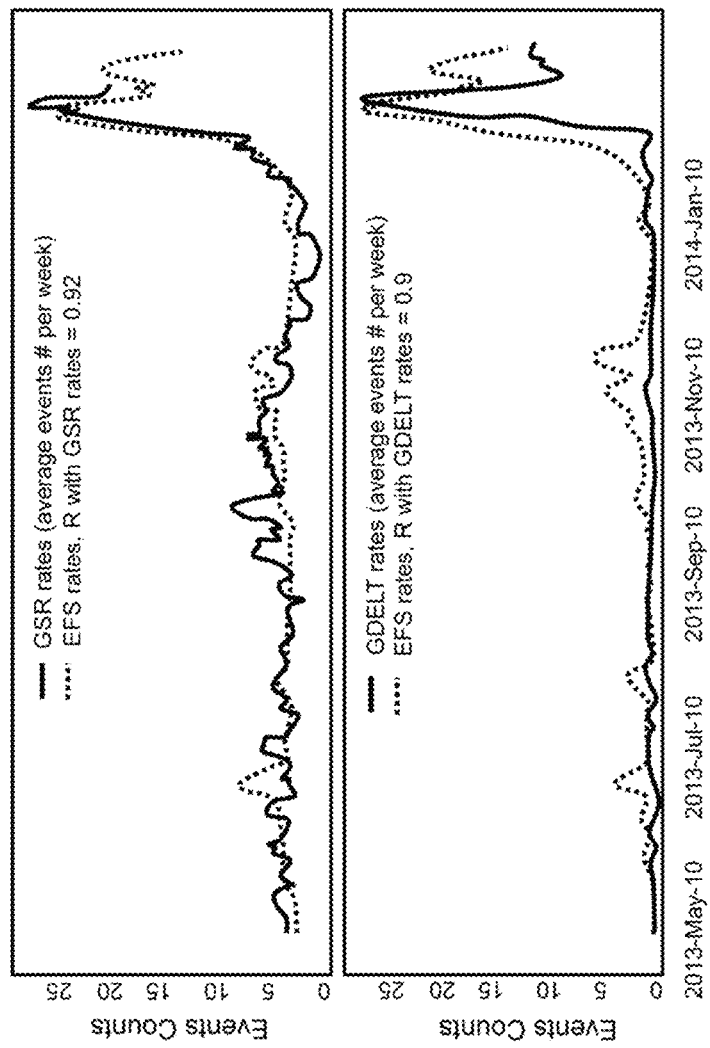
FIG. 5 is a set of plots illustrating an EFS extracted from Twitter™ according to embodiments of the present disclosure.

FIG. 5 illustrates examples of EFS signals extracted based on GSR (top row plot) and GDELT (bottom row plot). Here, GDELT is considered ground truth. It shows moving averages of ground truth and EFS, since the primary interest is averaged results rather than daily numbers. Two databases may be different in how they search. The biggest difference is in reflecting the background activity, where GSR provides more details than GDELT. It is evident from FIG. 5 that events reflected in time series are closer to GSR than to GDELT, taking into account both default and high level activity.

The top row of FIG. 5 depicts moving averages for GSR and EFS corresponding. The bottom row of FIG. 5 depicts rates of GDELT (moving average with a 7 day time window) and its rates of EFS signal. GDELT and GSR are different representations for civil unrest/protest activities. Therefore, the EFS signal corresponding to these databases (dashed lines on both plots) are very much similar. The main difference between GDELT and GSR is in description of background activity: for GSR it is higher than for GDELT, constituting ~5 events per day, as opposed to almost 0 events in GDELT. The number of events corresponding to the peak of activity is approximately the same. GSR shows more pre-peak activity, and the EFS signal extracted from GSR has a better correlation with GSR than with GDELT.

Further, results obtained for real-time prediction are presented. The algorithm, depicted in FIG. 3, was run once per week from Oct. 11, 2013 to Feb. 27, 2014 (21 weeks in total). The GSR was updated once per month, with a delay of half of a month, so studies began with an August GSR and ended with a February GSR (except for the last point in the sequence for which an exception was made, running it with the GSR for the same month (e.g., February GSR)).

Figure 6:
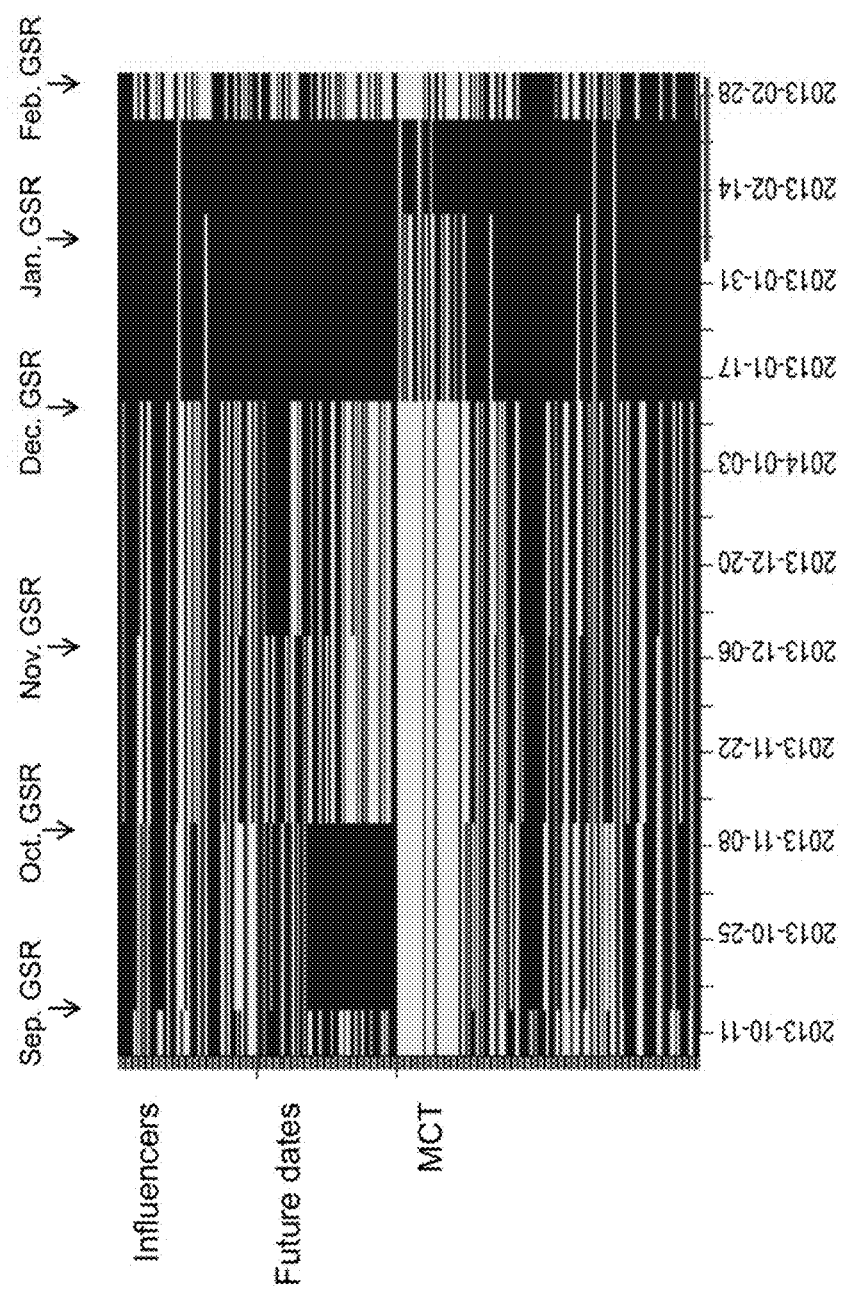
FIG. 6 is a matrix representing keywords from three datasets according to embodiments of the present disclosure.

The matrix in FIG. 6 provides some insights into which time series are picked to enter EFS extraction and how the process depends on updates in the GSR. The matrix consists of rows corresponding to different time series of keywords counts and columns for different time points. Specifically, FIG. 6 depicts a matrix representing keywords from three datasets (influencers, future dates and the model) configuration (MCT) which constitute an EFS signal (in yellow) and which did not enter the EFS (blue color). The arrows at the top of the matrix indicate time points when an updated GSR was used. The red bar on the bottom indicates a period of higher than usual civil unrest activity.

As shown in FIG. 6, the set forming the EFS slightly changed for GSRs from August to November, but the December GSR and the January GSR did bring large changes into the set, leaving fewer time series entering the EFS. The February GSR again chose the set which is close to the first four GSRs. An explanation for this can be related to the quality of the GSR itself and in the probable change of the events profile during the two months preceding a large civil unrest upswing that took place in February of 2014 in Venezuela. One can expect having different sets of keywords time series for default (background) activity and high levels of activity. Since ground truth (e.g., GSR in this example) can be as old as 1.5 months, just using the best set for this old GSR can lead to a failure in detecting a change in activity level. For example, FIG. 8B (described in further detail below) shows an example of such a failure while predicting the increase in civil unrest activity, which happened in December of 2013 in Argentina.

Figure 7:
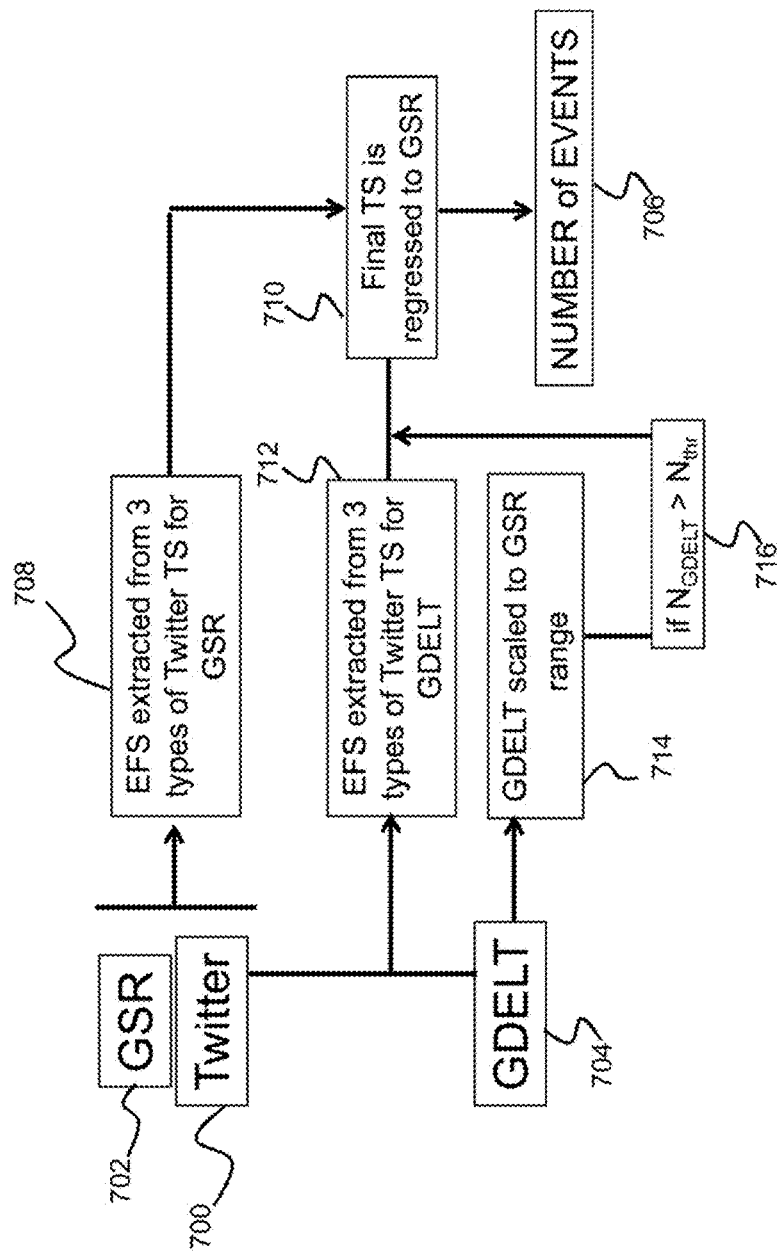
FIG. 7 is a diagram illustrating a scheme for EFS prediction according to embodiments of the present disclosure.

FIG. 7 illustrates the system for EFS prediction in a social media platform (e.g., Twitter™ 700) according to some embodiments of the present disclosure, switching between the GSR database 702 and the GDELT database 704 for predicting a number of events 706. As depicted in FIG. 7, during background activity, the EFS is extracted from, for example, three types of Twitter™ time series (TS) for GSR 708. The final TS is regressed to GSR 710 and a number of events 706 is predicted. Additionally, the EFS is extracted from three types of Twitter™ TS for GDELT 712, and GDELT is scaled to GSR range 714. The activity level in GDELT (element 712) is monitored. Once an increase in the number of events (i.e., more than an average number of events (or threshold) during a quiet period for GDELT) is detected (i.e., if $NG_{DELT} > N_{thr}$), predictions of the number of events 706 is based on the EFS for GDELT (element 712). This is not legitimate during background activity, since GSR based EFS has a much better correlation with GSR for this period than GDELT.

Figure 8:
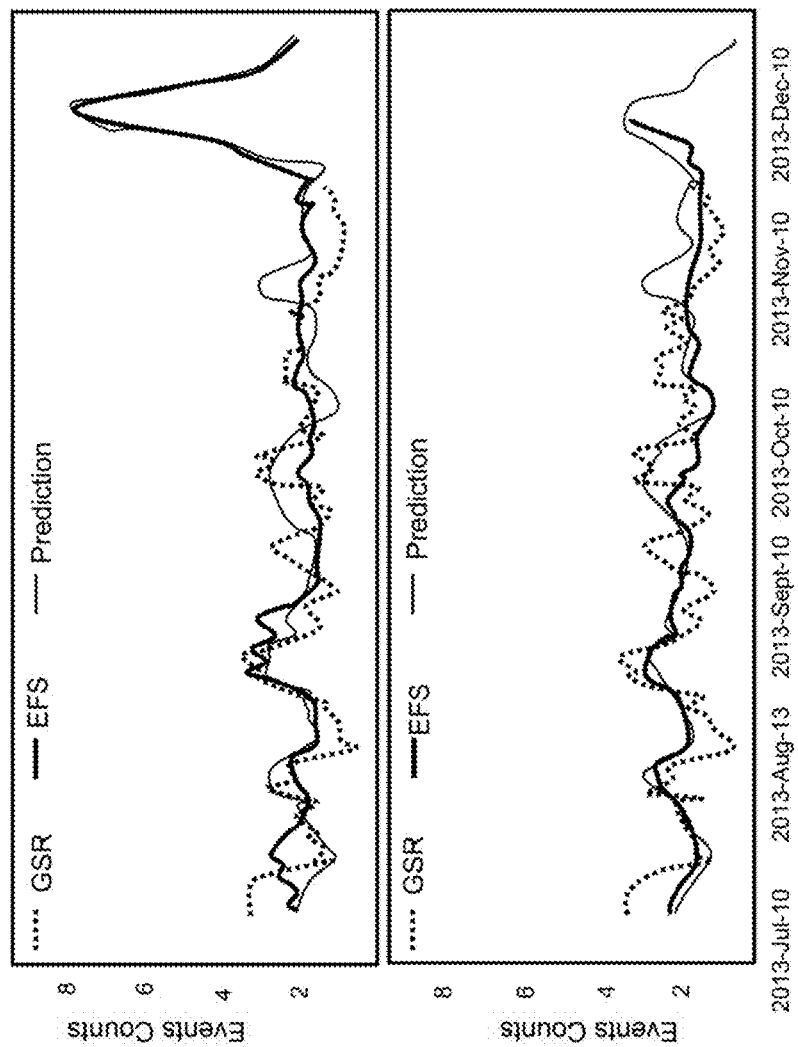
FIG. 8A is a plot illustrating prediction of activity level in Argentina with Global Database of Events, Language, and Tone (GDELT) switching between periods of high and low activity according to embodiments of the present disclosure.
FIG. 8B is a plot illustrating prediction of activity level in Argentina without GDELT switching between periods of high and low activity according to embodiments of the present disclosure.

FIGS. 8A and 8B depict prediction of the activity level in Argentina with (FIG. 8A) and without (FIG. 8B) GDELT switching between periods of high and low activity. The EFS signal based on GDELT was used instead of the EFS signal based on GSR in case the average number of events per week reflected in GDELT significantly exceeds the activity during the low activity period. The threshold of $N_a+2\sigma$, where $\sigma$ is a standard deviation for the number of events for the low activity period and $N_a$ represents the average number of events per week, showed good performance for switching parameters between two states of high and low activity.

Figure 9:
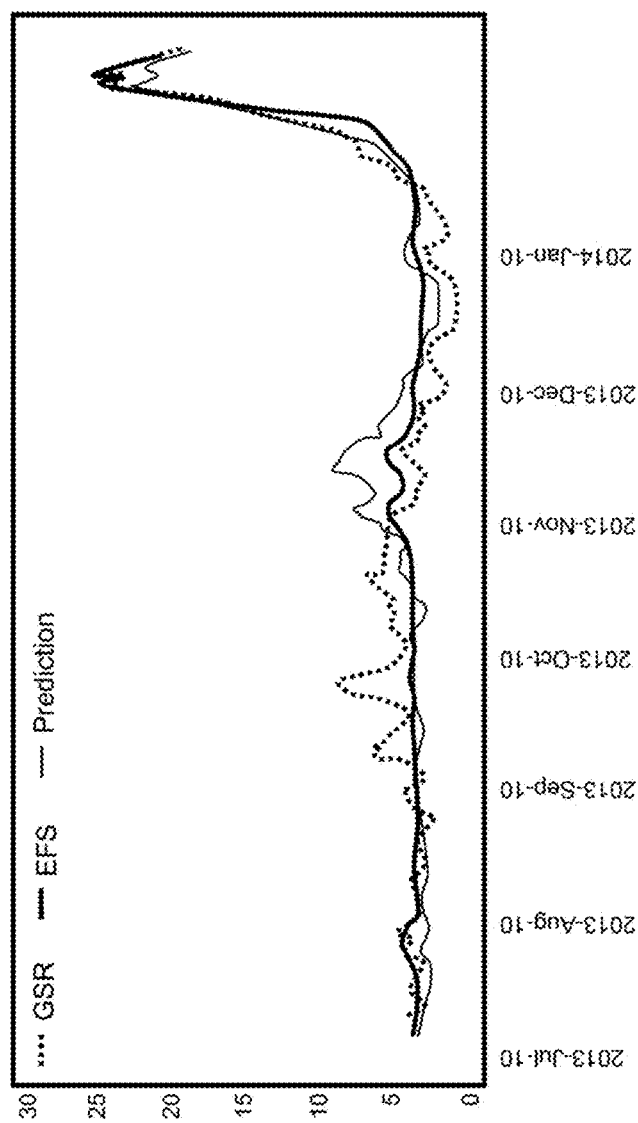
FIG. 9 is a plot illustrating prediction performance based on the EFS extracted from monitoring for Venezuela according to embodiments of the present disclosure.

In FIGS. 8A and 8B, prediction is depicted as a solid unbolded line, GSR based EFS is depicted as a dashed line, and the GDELT based EFS is depicted as a solid bolded line, which reflects the December upswing in Argentina. FIG. 9 is a plot displaying prediction based on the EFS extracted from GSR with GDELT monitoring for Venezuela according to various embodiments of the present invention. Here, the solid unbolded line represents a prediction made once per week for the next week's tweets and the latest available GSR. The solid bolded line represents the EFS, which usually has s slightly better correlation with GSR (represented by the dashed line), but is very close to the prediction line (represented by the solid unbolded line), reflecting the fact that the process described with estimated model parameters is stable during the period of the time of interest.

(3.3) Example for ILI-Related EFS Extraction and ILI Counts Prediction

Google™ Trends are proven to be a valuable piece of information for monitoring and surveillance of Influenza like illness (ILI) morbidity trends. The system described herein demonstrates how the level of disease spread can be estimated based on EFS signals extracted from Google™ Trends and Twitter™. The system according to various embodiments of the present invention was tested on 14 Latin America countries, for which PAHO ILI statistics are available.

Figure 10:
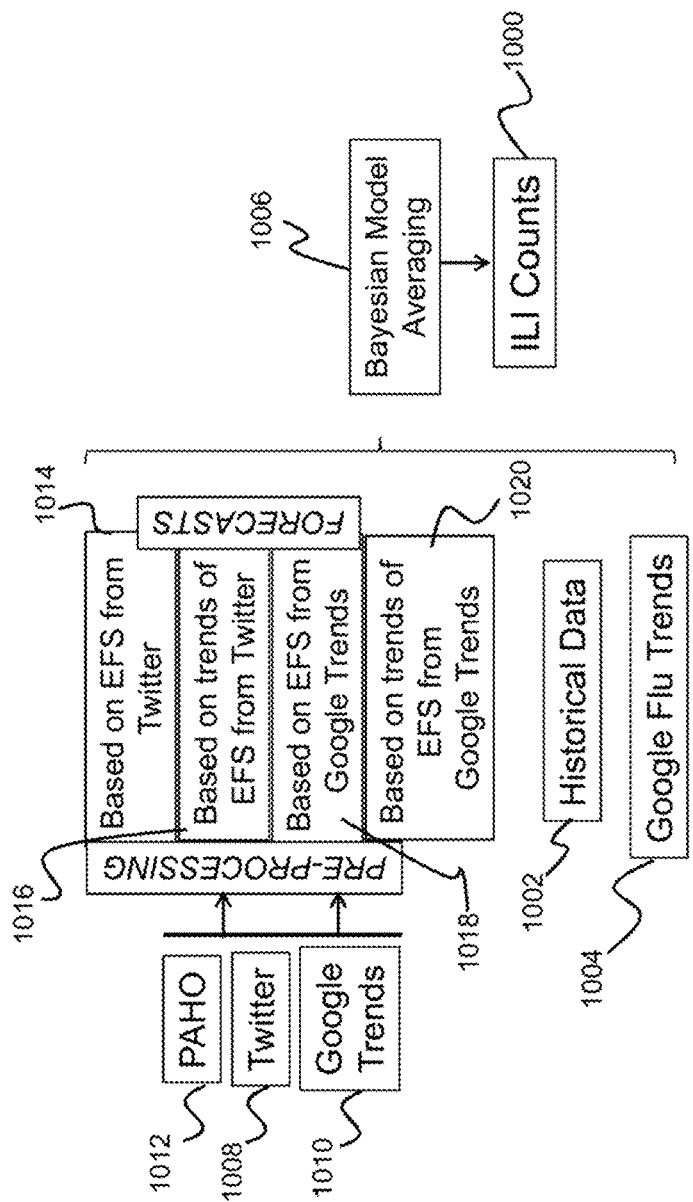
FIG. 10 is a flow diagram illustrating prediction of influenza-like illness (ILI) counts based on an EFS signal extracted from Google™ Trends and Twitter™ keywords time series according to embodiments of the present disclosure.

FIG. 10 illustrates the process flow for prediction of LI counts 1000 based on EFS signals extracted from Google™ Trends and Twitter™ keywords time series. Historical data 1002 and Google™ Flu Trends 1004 were included into Bayesian model averaging 1006 when available for a country. The algorithm was designed to account for cultural differences between countries. Pre-processing was performed on data received from Twitter™ 1008, Google™ Trends 1010, and PAHO 1012 statistics. In some countries, ILI morbidity trends are better reflected in Twitter™ 1008 than other social media platforms. In Google™ Trends 1008, signals extracted from indicators usually suffer from noise. To remove unwanted fluctuations, low frequency components are extracted from the EFS signal. The degree of correlation varies as well, from almost 0.05 for Nicaragua for Google™ Trends 1010 to 0.95 for Chile for Google™ Trends 1010. In total, four different forecasts (i.e., based on EFS from Twitter™ 1014, based on trends of EFS from Twitter™ 1016, based on trends from Google™ Trends 1018, based on trends of EFS from Google™ Trends 1020) based on social media, are made, and the forecasts 1014, 1016, 1018, and 1020 are automatically combined. The system according to various embodiments also employs historical data 1002 from the PAHO 1012 website and Google™ Flu Trends 1004 (where they are available). Bayesian model averaging 1006 is used to weight predictions according to the historical performance of different models.

A quality score metric (QS) was used to evaluate performance at different stages of the algorithm. The QS was determined as follows:

$$QS = \frac{|N_{paho} - N_{predict}|}{\max(N_{paho}, N_{paho}, 10)},$$

where $N_{paho}$ and $N_{predict}$ are PAHO and predicted ILI counts. QS ranges from 0 to 4.

An EFS signal extracted from different social media provides prediction for a period of time when official statistics are unavailable. The prediction was made based on regression for a long section of EFS (e.g., 5 months, or 150 days) on statistics of CU from GSR or GDELT. It is possible to further refine prediction in the case of ILI, where changes in morbidity trends are slow and one can employ regression with a long (e.g., from 25 to 52 weeks) sliding time window (STW) and a short one (e.g., from 4 weeks to 16 weeks). The difference between the two is that the short sliding time window works better if one has to make a prediction for a relatively short period of time (e.g., one to two weeks) or, for example, when a substantial change of ILI counts is not expected. This scenario predicts the number of incidences based on current trends and cannot take into account a switch in trends. Prediction usually suffers from a lag in this case, which will be described in further detail below.

If forecast time becomes long enough (e.g., more than 2 weeks), current trends may not work anymore, so one uses regression with a long STW. Regression works in this case as a tool to normalize the EFS signal, and align it with and scale it within the range of PAHO counts for a substantially long period of time (e.g., more than half a year). The algorithm is designed so that original/not filtered EFS are regressed with a short time window. Trends of EFS, obtained via Fast Fourier Transform to remove frequencies less than 10 weeks, are regressed with long STW. Calculations showed that additional forecasts for regression with both STW (short and long) applied to original and trends of EFS do not improve the final QS.

Figure 11:
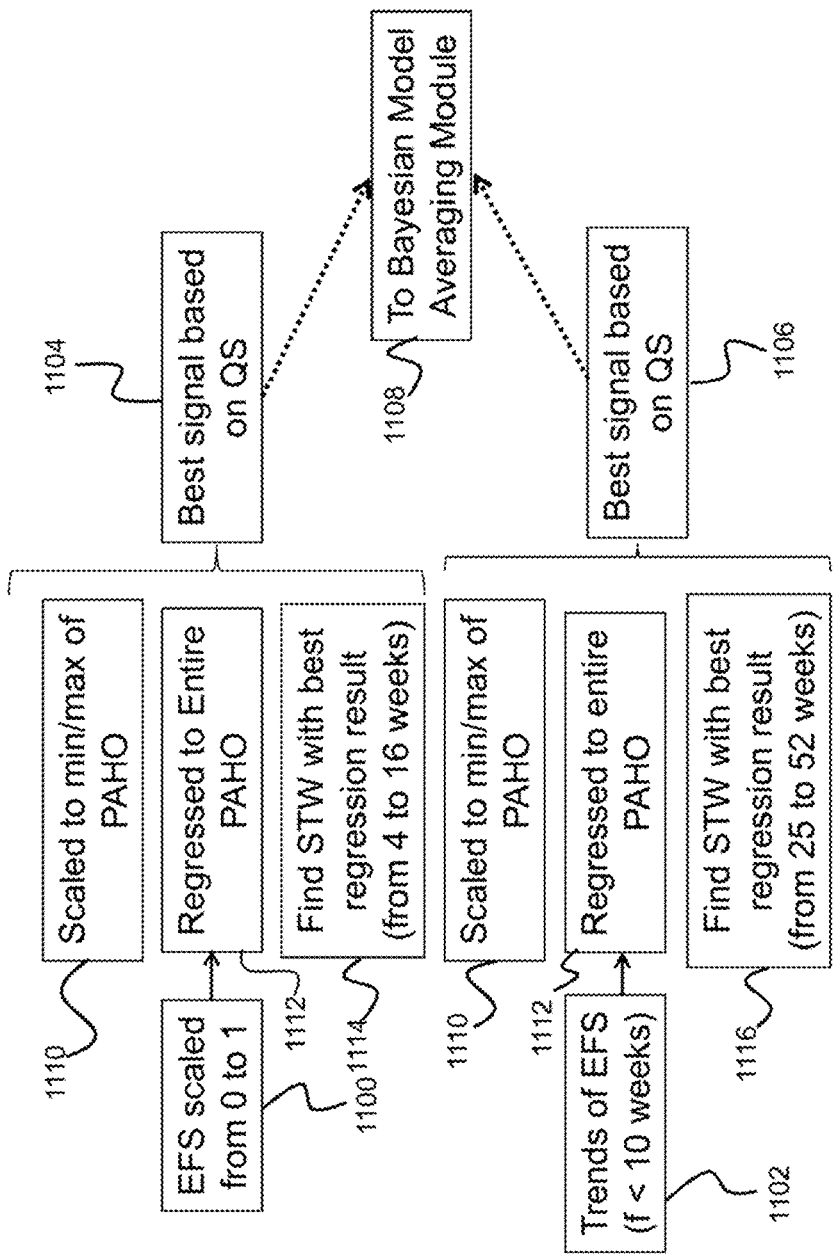
FIG. 11 is a diagram illustrating processing steps for original EFS and trends of EFS before those signal enter Bayesian model averaging (BMA) according to embodiments of the present disclosure.

FIG. 11 illustrates the processing steps for original EFS 1100 and trends of EFS 1102 before the best QS signals from both 1104 and 1106 enter a Bayesian model averaging module 1108. As described above, for each of the original EFS 1100 and trends of EFS 1102, (a) the data are scaled from a minimum to a maximum of available PAHO statistics 1110, (b) the data are regressed to the entire PAHO statistics 1112, and (c) the sliding time window (STW) with the best regression result from 4 to 16 weeks 1114 for original EFS 1100, or from 25 to 52 weeks 1116 for trends of EFS 1102 is found. From (a), (b), and (c), the best signal based on QS for original EFS 1104 and the best signal based on QS for trends of EFS 1106 are determined.

(3.3.1) Google™ Trends and Twitter™ Data: Keywords Time Series Extraction and Pre-Processing Steps The Google™ Trends information was downloaded from their website. Typically, the downloader is given a query file, listing the search strings, locations, and a date range. This query file is then converted to a series of individual searches, each one consisting of a single search string, single location, and date range. The downloader also maintains a calendar-week cache. The downloader checks the weekly cache, and if no match is found, then it does a web download of the individual search. After all the individual searches are completed, they are assembled together into a time-series file.

There were 131 health-related keywords in Spanish, and English (such as "gripe H1N1", "la gripe aviar", "nueva gripe", "la gripe del cerdo", "amarga la garganta" and others as determined by an expert), related to the name, treatment, symptoms of ILI and other diseases for use in experimental studies. Google™ Trends data covered the time period from the January 2004 up to a current date. Time granularity of the signal is weekly or monthly, depending on search strength and keyword "popularity".

A set of time series from Twitter™ for health-related keyword counts was downloaded using a model configuration tool. The total list comprises 141 items (same as for GT), compiled by a domain expert. Tweets were downloaded from GNIP from their Decahose service, which provides a real-time feed of a statistically valid random sample of at least 10% of all Tweets. The Tweets were then geocoded and loaded into an Elasticsearch server, indexed by location, date, time, and various other fields. The model configuration tool is typically called with a query file, listing the search strings, locations, and a date range. The model configuration tool queries the Elasticsearch server, and returns a time-series file. The time period for Twitter™ data is from May of 2012 up to a current date.

Google™ Trends usually experience significant trends due to the increased number of Internet users, so they were de-trended (for some countries) and scaled into the range from 0 to 1. Additionally, a monthly signal was recalculated to a weekly level. After these pre-processing steps were completed, the EFS signal was extracted as described above. For some countries, EFS extracted from both Twitter™ and Google™ Trends followed a logarithm of ILI counts, as shown in FIGS. 12A and 12B. It is related to the country population size, how popular the social media is, and how high the level of ILI morbidity is. Specifically, FIGS. 12A and 12B depict plots of EFS (represented by dashed lines) extracted from Google™ Trends for Argentina. PAHO data (represented by solid lines) shown in FIG. 12A are in log scale, while FIG. 12B shows PAHO data (represented by solid lines) in original scale.

For FIGS. 14-18, official statistics of confirmed cases were obtained from the PAHO website at http://ais.paho.org/phip/viz/ed_flu.asp taken on Aug. 26, 2015. Data was obtained weekly and updated within a range of 1 to 8 weeks. Official reports started in the year 2010, so historical data was used in the final averaging.

Figure 13A:
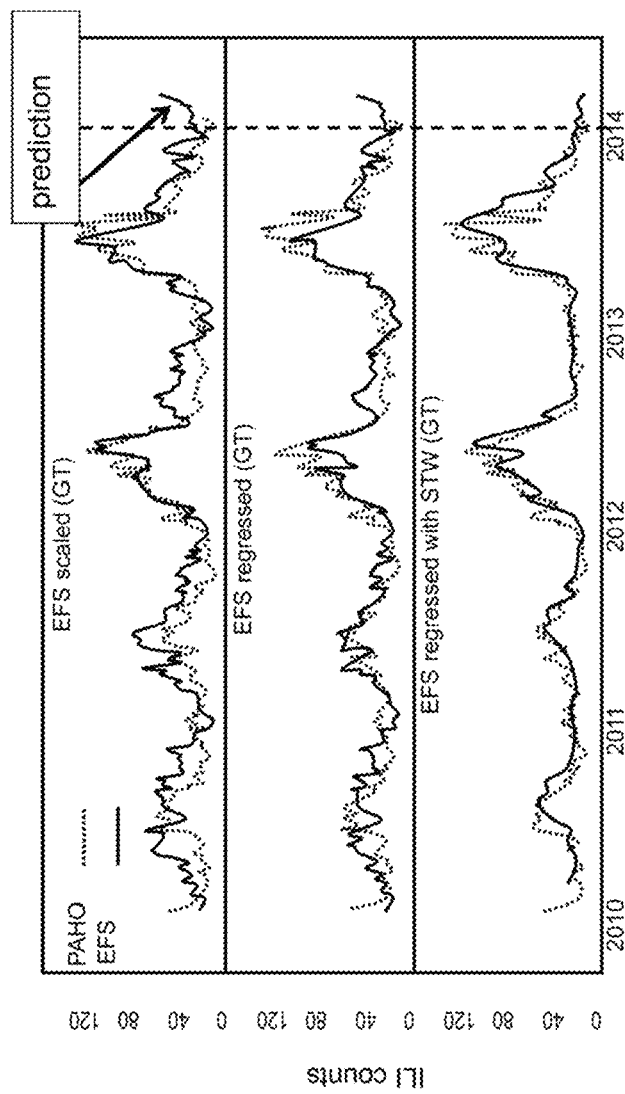
FIG. 13A is a plot illustrating an EFS extracted from Google™ Trends for original EFS according to embodiments of the present disclosure.
Figure 13B:
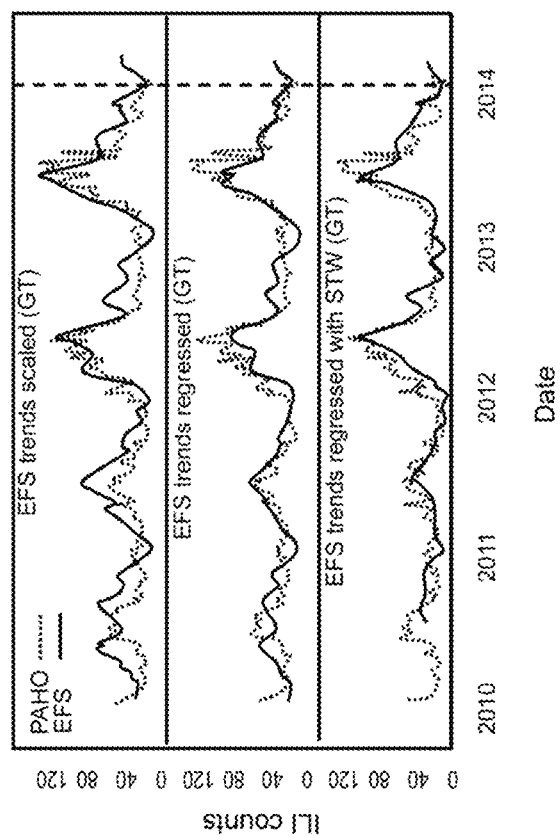
FIG. 13B is a plot illustrating an EFS extracted from Google™ Trends for trends of EFS according to embodiments of the present disclosure.
Figure 14A:
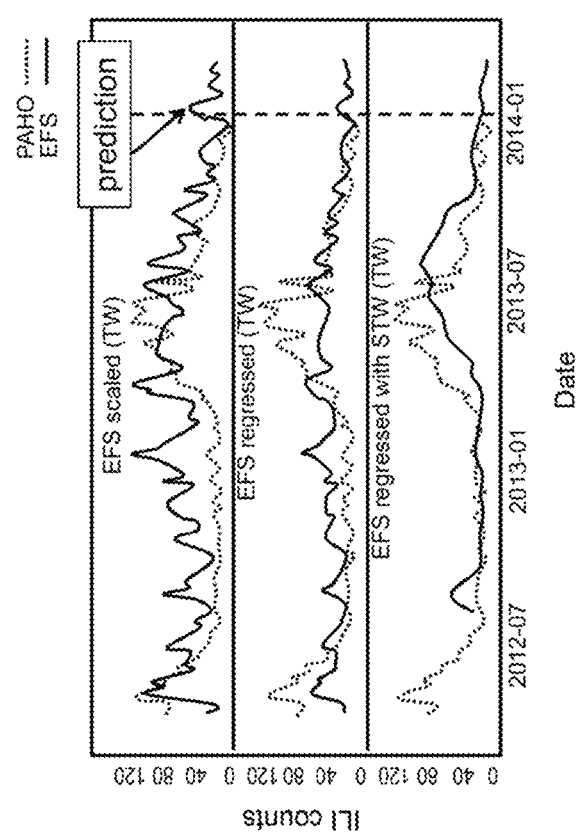
FIG. 14A is a plot illustrating an EFS extracted from Twitter™ for original EFS according to embodiments of the present disclosure.
Figure 14B:
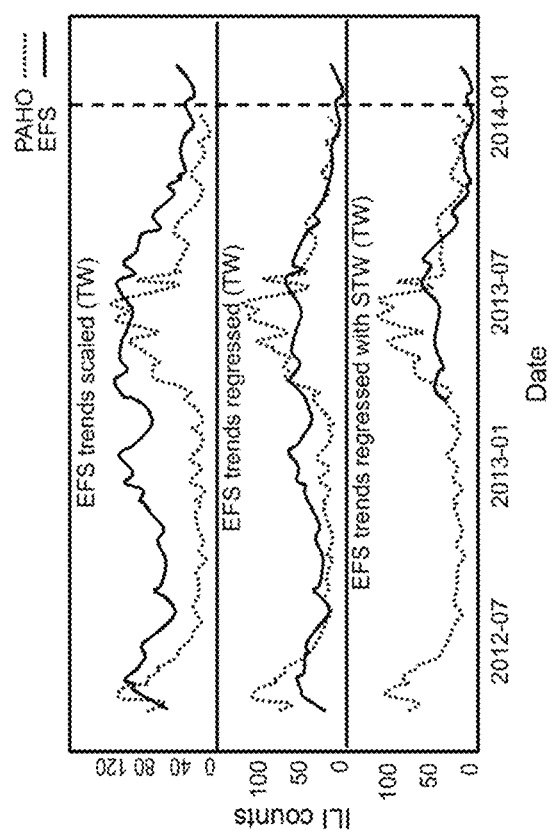
FIG. 14B is a plot illustrating an EFS extracted from Twitter™ for trends of EFS according to embodiments of the present disclosure.

Original and processed EFS for Colombia are presented in FIGS. 13A and 13B for Google™ Trends and in FIGS. 14A and 14B for Twitter™. For Colombia, a log scale was not used, and no de-trending was needed. The initial EFS signal is scaled from 0 to 1. To use the EFS signal for prediction, three different types of processing/scaling were used in FIGS. 13A and 13B. The plot in the first row of each depicts the EFS scaled from a minimum to a maximum value of available PAHO statistics. The plot in the second row of FIGS. 13A and 13B illustrate the EFS regressed to PAHO data for the whole period of time, when PAHO are available. In the third row of FIGS. 13A and 13B, the EFS was regressed to PAHO with a sliding time window (STW) (for original EFS STW=5 weeks; for trends of EFS-STW=32 weeks). The dashed vertical line represents the time point before which PAHO statistics were available, so the solid line (representing the EFS) after the vertical line is a prediction. One can tell that ILI morbidity trends are well reflected in Google™ Trends, as all four years' of peaks/hollows of ILI counts show good correspondence with the peaks/hollows of the EFS signal. Prediction here was made for more than 2 weeks-8 weeks, so it is clearly seen that regression with short a STW failed to predict the beginning of an upswing in ILI counts.

FIGS. 14A and 14B depict examples of EFS extracted from Twitter™, where notations are the same as in FIGS. 13A and 13B. ILI morbidity trends are not reflected as well in Twitter™ as in Google™ trends. An almost flat behavior of time series leads to substantial lag for the signal obtained as a result of regression with a STW=16 weeks in this case. Regression for EFS trends with STW=40 weeks has much better agreement with real ILI counts.

Figure 15:
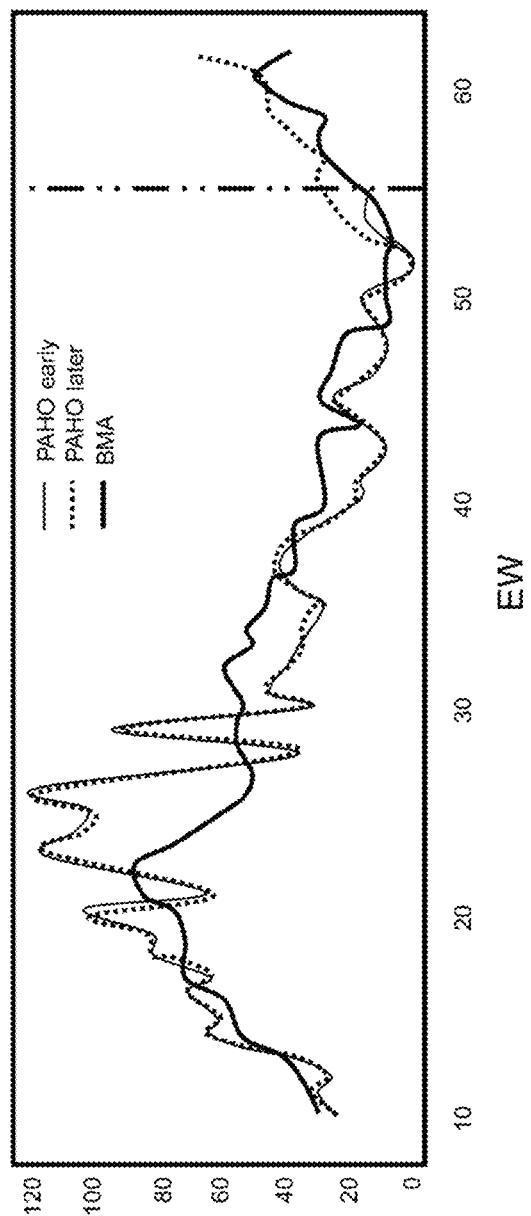
FIG. 15 is a plot illustrating a prediction result for BMA averaging according to embodiments of the present disclosure.

A prediction result for BMA averaging is displayed in FIG. 15. The solid unbolded line represents PAHO data used with the forecasting algorithm, ending with EW=3. The dashed line represents data which were published later (i.e., there were no intermediate updates for PAHO data points in between). The dashed vertical line represents the time points after which real prediction with BMA starts (solid bold line). The plots showed good agreement between prediction and real ILI counts, indicating the capability to predict a beginning of the upswing using the invention described herein.

The performance of prediction and comparison of quality of various forecasts is displayed in the table in FIG. 16. Results were obtained for predictions made one week ahead for a period of time of approximately 52 weeks. As one might expect, countries with large populations have, on average, higher quality scores with better scores for Google™ Trends. Countries that are less popular and primarily agricultural, such as Nicaragua, El Salvador, and Honduras, demonstrated a poorer reflection of ILI trends in social media. Forecasts based on the EFS signal better predict PAHO data than historical or GFT predictions. In most cases, the combination of forecasts with BMA outperformed separate predictions.

The EFS curve is calculated based on the idea of summation of time series containing a signal of interest to increase SNR. The EFS curve shows high correlation with ILI counts. Regression of this curve on ground truth is used for evaluation of a future activity level. The whole system was tested in real-time for prediction of the number of civil unrest events and ILI counts. The system according to embodiments of the present invention showed good performance with a QS of ~2.95 for all countries in the case of ILI and relative error less than 15% in prediction of CU events.

The predictions generated according to the principals of the present invention may be used to reconfigure a plurality of electronic assets, such as cell phone towers or surveillance cameras, in anticipation of a civil disturbance. This reconfiguration may limit the ability of disturbance participants to coordinate their activities and, thereby, attenuate the severity of the disturbance. Another reconfiguration may apply to surveillance cameras to improve surveillance of particular regions.

Other systems to reconfigure include, without implying a limitation, traffic lights, public transportation systems, public safety staffing profiles, communication services (e.g., turn off cell phone service or block phone numbers). Further, in managing a disease outbreak, the present invention can be used to alert medical vendors to improve or increase productions of vaccines (or other medications) or place some public facilities (e.g., hospitals, college dorms) under quarantine.

In addition to having applications from a reconfiguration perspective, one can also leverage the technology for service-based applications, such as alerting tourists or travelers to avoid hot spots (i.e., areas identified as having a disease outbreak or protests) with alternative travel plans. Furthermore, the system described herein is useful for alerting first responders (e.g., medical responders, police) to reroute or reallocate their resources to the hot spots.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for monitoring social events using signals extracted from a social media platform, the system comprising:
one or more processors and a non-transitory memory having instructions encoded thereon such that when the instructions are executed, the one or more processors perform operations of:
filtering a time series of social network data obtained from a social media platform based on a correlation between the time series and a set of around truth data to remove noise from the time series;
extracting enhanced filtered signals (EFS) from the filtered time series of social network data based on an amplification of a signal obtained via a summation of signals relevant to a social activity event in the filtered time series of social network data;
monitoring a level of human social activity related to the social activity event in the social network data;
detecting an increase in a number of social activity events in the social network data compared to the set of around truth data; and
generating an alert regarding the increase in the number of social activity events, wherein the alert is provided electronically via an electronic system.

2. The system as set forth in claim 1, wherein the extracted EFS is used to generate at least one prediction of at least one of a future social activity event and a trend in human social activity related to the future social activity event.

3. The system as set forth in claim 1, wherein the one or more processors further perform an operation of filtering the time series of data with a threshold value $T_r$, wherein the threshold value $T_r$ is an average correlation coefficient between a randomly generated time series of data and the set of ground truth data.

4. The system as set forth in claim 3, wherein the one or more processors further perform an operation of regressing the extracted EFS on the set of ground truth data with different time windows to obtain a set of regression fits between the extracted EFS and the set of ground truth data.

5. The system as set forth in claim 4, wherein the one or more processors further perform operations of:
obtaining a set of parameters from the set of regression fits; and
generating the at least one prediction of the future social activity event and the trend in human social activity related to the social activity event by applying the set of parameters to new sets of time series data.

6. The system as set forth in claim 2, wherein Bayesian model averaging is used to weight at least one of the prediction of the future social activity event and the trend in human social activity related to the future social activity event according to historical data.

7. A computer-implemented method for monitoring social events, comprising:
an act of causing one or more processors to execute instructions stored on a non-transitory memory such that upon execution, the one or more processors perform operations of:
filtering a time series of social network data obtained from a social media platform based on a correlation between the time series and a set of ground truth data to remove noise from the time series;
extracting enhanced filtered signals (EFS) from the filtered time series of social network data based on an amplification of a signal obtained via a summation of signals relevant to a social activity event in the filtered time series of social network data;
monitoring a level of human social activity related to the social activity event in the social network data;
detecting an increase in a number of social activity events in the social network data compared to the set of ground truth data; and
generating an alert regarding the increase in the number of social activity events, wherein the alert is provided electronically via an electronic system.

8. The method as set forth in claim 7, wherein the extracted EFS is used to generate at least one prediction of at least one of a future social activity event and a trend in human social activity related to the future social activity event.

9. The method as set forth in claim 7, wherein the one or more processors further perform an operation of filtering the time series of data with a threshold value $T_r$, wherein the threshold value $T_r$ is an average correlation coefficient between a randomly generated time series of data and the set of ground truth data.

10. The method as set forth in claim 9, wherein the one or more processors further perform an operation of regressing the extracted EFS on the set of ground truth data with different time windows to obtain a set of regression fits between the extracted EFS and the set of ground truth data.

11. The method as set forth in claim 10, wherein the one or more processors further perform operations of:
obtaining a set of parameters from the set of regression fits; and
generating at least one of the prediction of the future social activity event and the trend in human social activity related to the future social activity event by applying the set of parameters to new sets of time series data.

12. The method as set forth in claim 8, wherein Bayesian model averaging is used to weight at least one of the prediction of the future social activity event and the trend in human social activity related to the future social activity event according to historical data.

13. A computer program product for monitoring social events, the computer program product comprising computer-readable instructions stored on a non-transitory computer-readable medium that are executable by a computer having a processor for causing the processor to perform operations of:
   filtering a time series of social network data obtained from a social media platform based on a correlation between the time series and a set of ground truth data to remove noise from the time series;
   extracting enhanced filtered signals (EFS) from the filtered time series of social network data based on an amplification of a signal obtained via a summation of signals relevant to a social activity event in the filtered time series of social network data;
   monitoring a level of human social activity related to the social activity event in the social network data;
   detecting an increase in a number of social activity events in the social network data compared to the set of around truth data; and
   generating an alert regarding the increase in the number of social activity events, wherein the alert is provided electronically via an electronic system.

14. The computer program product as set forth in claim 13, wherein the extracted EFS is used to generate at least one prediction of at least one of a future social activity event and a trend in human social activity related to the future social activity event.

15. The computer program product as set forth in claim 13, further comprising instructions for causing the one or more processors to perform an operation of filtering the time series of data with a threshold value $T_r$, wherein the threshold value $T_r$ is an average correlation coefficient between a randomly generated time series of data and the set of ground truth data.

16. The computer program product as set forth in claim 15, further comprising instructions for causing the one or more processors to perform an operation of regressing the extracted EFS on the set of ground truth data with different time windows to obtain a set of regression fits between the extracted EFS and the set of ground truth data.

17. The computer program product as set forth in claim 16, further comprising instructions for causing the one or more processors to perform operations of:
   obtaining a set of parameters from the set of regression fits; and
   generating at least one of the prediction of the future social activity event and the trend in human social activity related to the social activity event by applying the set of parameters to new sets of time series data.

18. The computer program product as set forth in claim 14, wherein Bayesian model averaging is used to weight at least one of the prediction of the future social activity event and the trend in human social activity related to the social activity event according to historical data.

* * * * *